US009483569B2

(12) United States Patent
Amano et al.

(10) Patent No.: US 9,483,569 B2
(45) Date of Patent: Nov. 1, 2016

(54) ELECTRONIC-MANUAL BROWSING APPARATUS AND SYSTEM

(71) Applicants: Koji Amano, Tokyo (JP); Satoshi Udo, Tokyo (JP); Hikaru Sakata, Tokyo (JP)

(72) Inventors: Koji Amano, Tokyo (JP); Satoshi Udo, Tokyo (JP); Hikaru Sakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/436,948

(22) PCT Filed: Dec. 26, 2012

(86) PCT No.: PCT/JP2012/083693
§ 371 (c)(1),
(2) Date: Apr. 20, 2015

(87) PCT Pub. No.: WO2014/102935
PCT Pub. Date: Jul. 3, 2014

(65) Prior Publication Data
US 2015/0261872 A1 Sep. 17, 2015

(51) Int. Cl.
*G06F 17/00* (2006.01)
*G06F 17/30* (2006.01)
(Continued)

(52) U.S. Cl.
CPC ......... *G06F 17/30876* (2013.01); *G05B 19/05* (2013.01); *G06F 9/4443* (2013.01); *G06F 17/3089* (2013.01);
(Continued)

(58) Field of Classification Search
CPC .............. G06F 17/30876; G06F 17/3089;
G06F 17/21; G06F 17/30; G06F 17/00;
G06F 9/4443; G06F 9/4446; G06F 3/12;
G05B 19/05; G05B 2219/13129
USPC .................. 715/204, 231–239, 255, 724
See application file for complete search history.

(56) References Cited

U.S. PATENT DOCUMENTS 5,546,502 A   8/1996 Hart et al.
5,884,315 A   3/1999 Dunn
(Continued)

FOREIGN PATENT DOCUMENTS

JP   05-119988 A   5/1993
JP   06-274300 A   9/1994
(Continued)

OTHER PUBLICATIONS

International Search Report for PCT/JP2012/083693 dated Feb. 12, 2013.
(Continued)

*Primary Examiner* — Quoc A Tran
(74) *Attorney, Agent, or Firm* — Sughrue Mion, PLLC

(57) ABSTRACT

An electronic-manual browsing apparatus includes an electronic-manual-display processing section that displays, on an electronic-manual display screen on a display section, an electronic manual including a sample program concerning a control apparatus, a program-creation-screen-display processing section that displays, on the display section, a program creation screen for creating a program used in the control apparatus, and a program copy section that copies the sample program in the electronic manual selected according to an instruction from a user and temporarily stores the sample program. The program-creation-screen-display processing section pastes the stored sample program in the program creation screen in a format editable on the program creation screen.

17 Claims, 19 Drawing Sheets

(51) Int. Cl.
  *G05B 19/05* (2006.01)
  *G06F 9/44* (2006.01)
  *G06F 17/21* (2006.01)
  *G06F 3/12* (2006.01)

(52) U.S. Cl.
  CPC ...... *G05B 2219/13129* (2013.01); *G06F 3/12* (2013.01); *G06F 9/4446* (2013.01); *G06F 17/21* (2013.01); *G06F 17/30* (2013.01); *G06F 17/30879* (2013.01)

(56) References Cited

U.S. PATENT DOCUMENTS

| | | | |
|---|---|---|---|
| 6,041,182 | A | 3/2000 | Hart et al. |
| 6,049,792 | A | 4/2000 | Hart et al. |
| 6,259,445 | B1 | 7/2001 | Hennum et al. |
| 6,295,525 | B1 | 9/2001 | Hart et al. |
| 6,724,401 | B1 | 4/2004 | Hennum et al. |
| 2001/0051938 | A1 | 12/2001 | Hart et al. |
| 2002/0004804 | A1 | 1/2002 | Muenzel |
| 2003/0200269 | A1 | 10/2003 | Maehara et al. |
| 2004/0073403 | A1 | 4/2004 | Hart et al. |
| 2006/0080616 | A1* | 4/2006 | Vogel ............... G06F 9/4443 715/769 |
| 2010/0259557 | A1* | 10/2010 | McMullen ............ G06T 11/60 345/619 |

FOREIGN PATENT DOCUMENTS

| | | |
|---|---|---|
| JP | 07-093046 A | 4/1995 |
| JP | 07-098708 A | 4/1995 |
| JP | 11-161398 A | 6/1999 |
| JP | 11-509662 A | 8/1999 |
| JP | 2002-108875 A | 4/2002 |
| JP | 2002-160588 A | 6/2002 |
| JP | 2002-540490 A | 11/2002 |
| JP | 2003-248657 A | 9/2003 |
| JP | 2003-271662 A | 9/2003 |
| JP | 2003-529147 A | 9/2003 |
| JP | 2011-158959 A | 8/2011 |
| TW | 200627231 A | 8/2006 |
| WO | 00/45299 A2 | 8/2000 |

OTHER PUBLICATIONS

Japanese Office Action for JP 2013-519914 dated Jun. 17, 2013.
Communication dated May 22, 2015, issued by the Intellectual Property Office of Taiwan in corresponding Taiwanese Application No. 102114336.

* cited by examiner

FIG.3
(a)
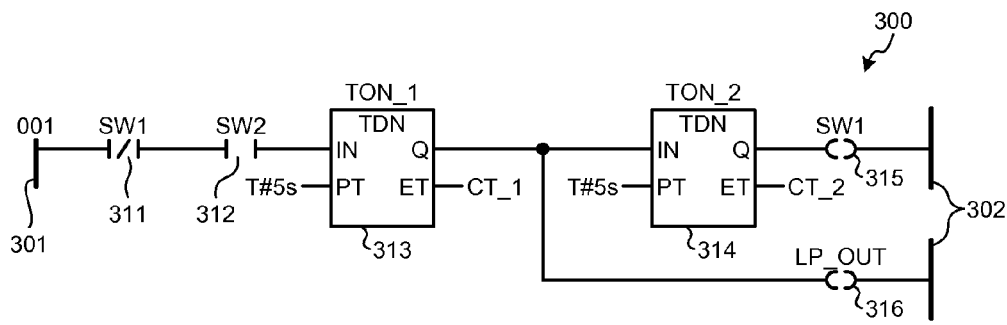
(b)
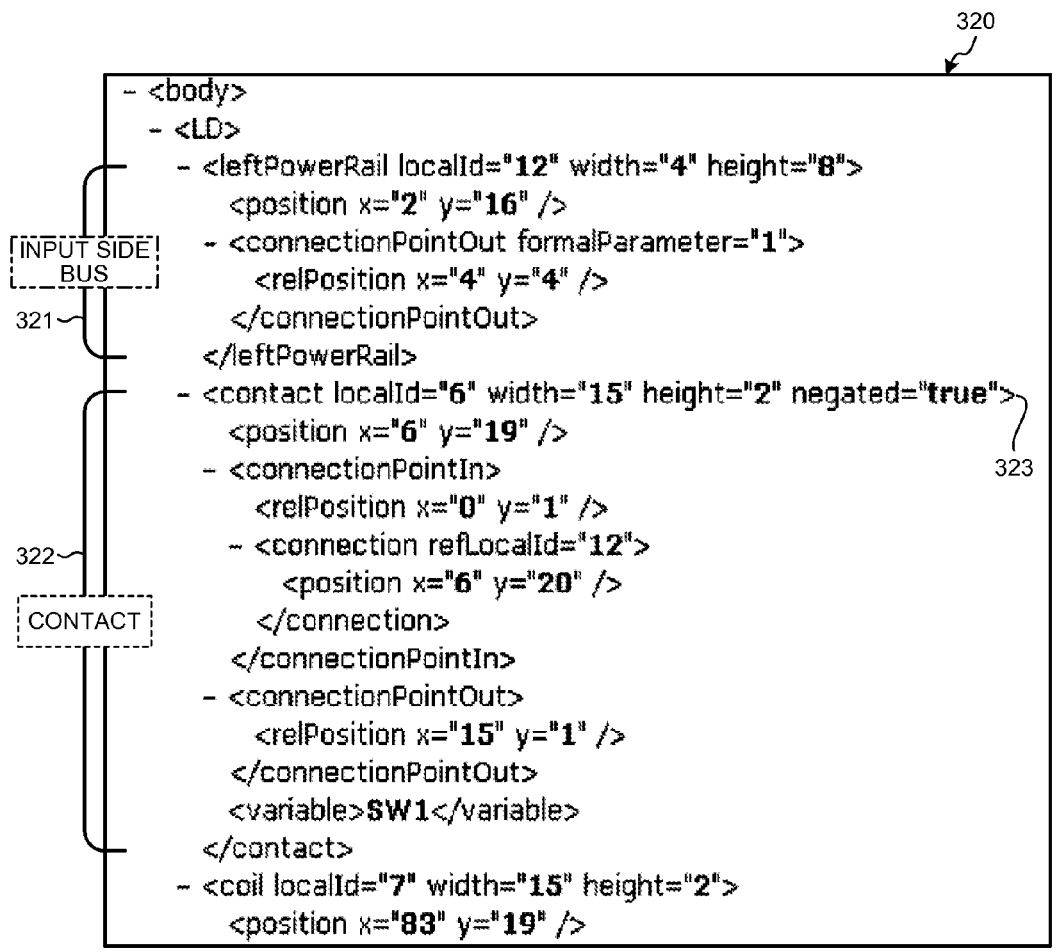

FIG.6
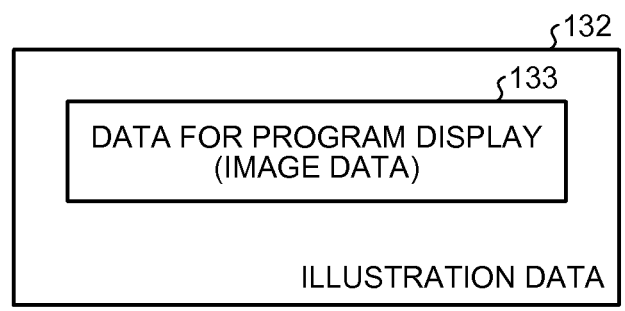
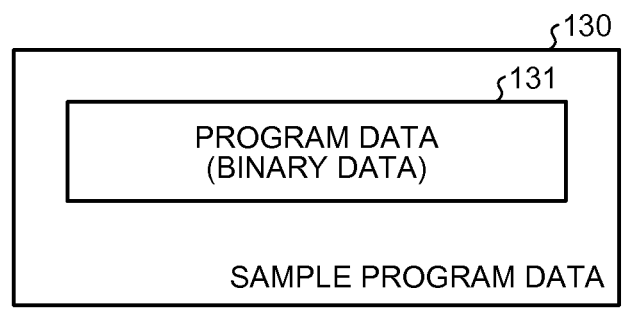

FIG.9
(a) 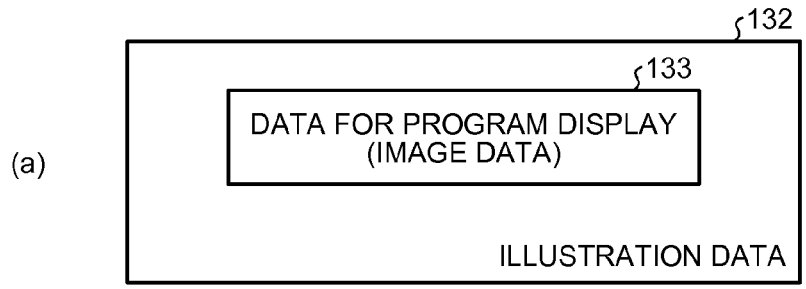
(b) 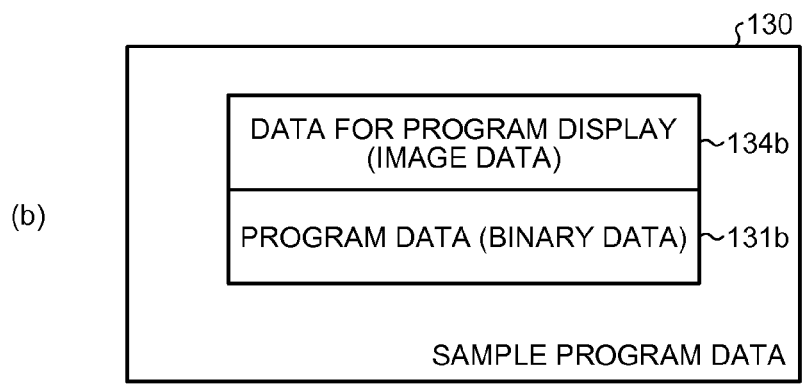
(c) 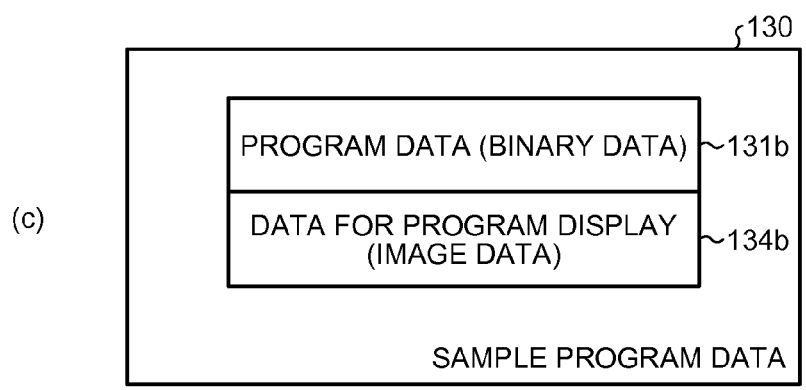

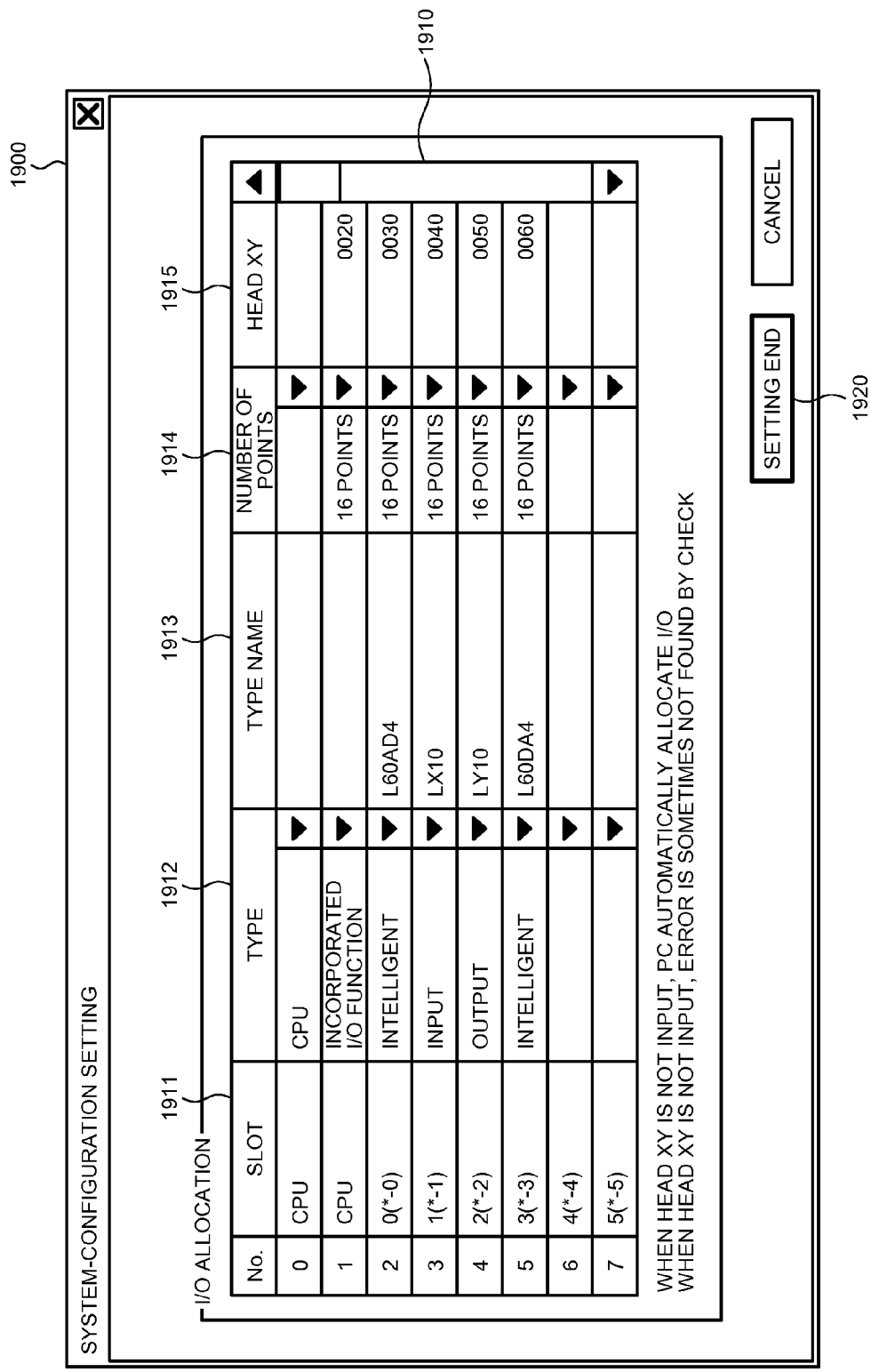

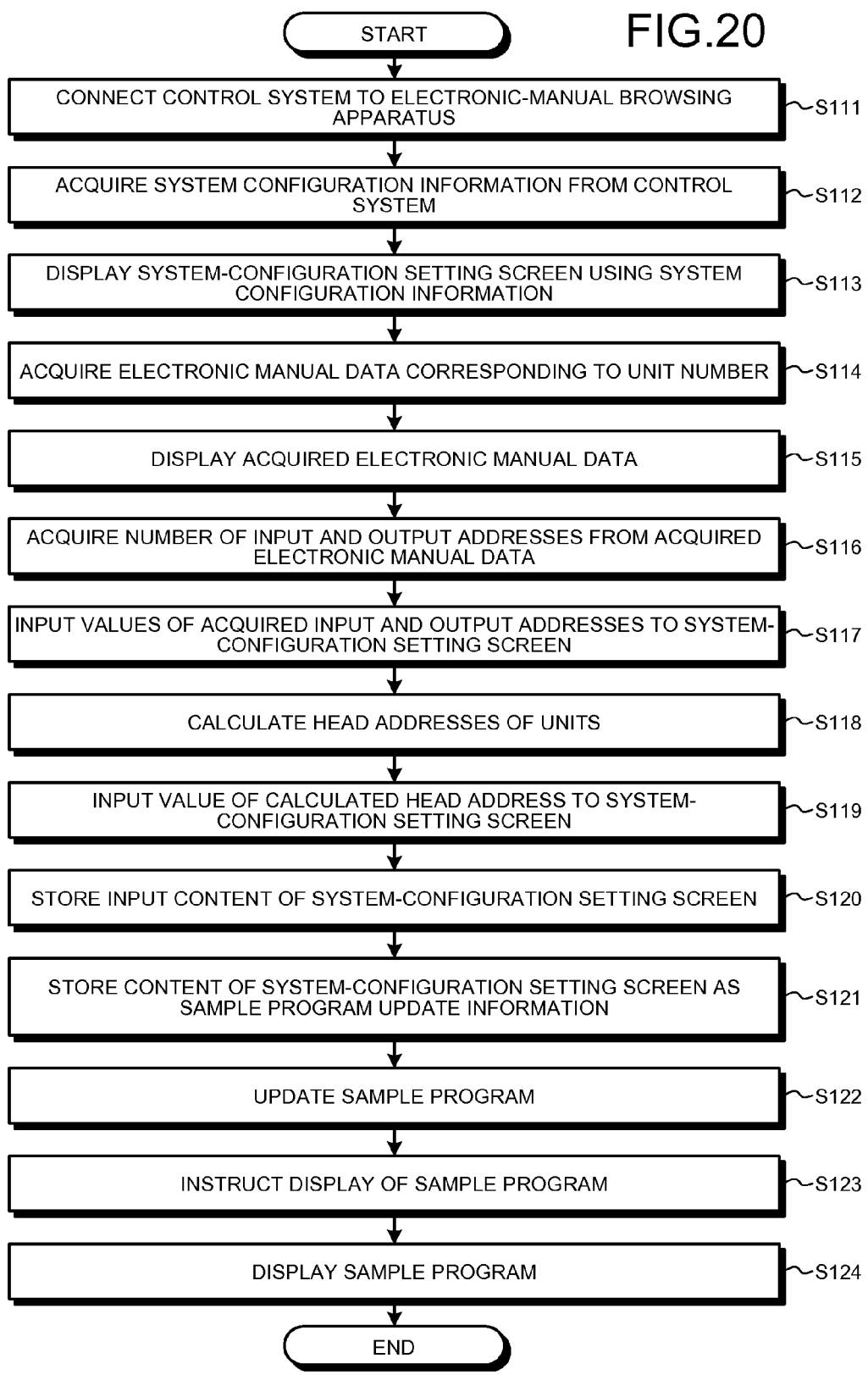

ELECTRONIC-MANUAL BROWSING APPARATUS AND SYSTEM

CROSS REFERENCE TO RELATED APPLICATIONS

This application is a National Stage of International Application No. PCT/JP2012/083693 filed Dec. 26, 2012, the contents of all of which are incorporated herein by reference in their entirety.

FIELD

The present invention relates to an electronic-manual browsing apparatus and an electronic-manual browsing system.

BACKGROUND

Electronic apparatuses such as peripheral apparatuses are connected to a computer. Application software operating on the computer is installed in the computer. Therefore, conventionally, besides a manual (an operation manual) of the computer, manuals of the electronic apparatuses and manuals of the application software are independently present. Under such a situation, there has been proposed an electronic manual system with which the manuals of the computer, the electronic apparatuses, and the application software can be viewed on the computer in association and coordination with one another (see, for example, Patent Literature 1).

CITATION LIST

Patent Literature

Patent Literature 1: Japanese Patent Application Laid-Open No. 2003-271662

SUMMARY

Technical Problem

Incidentally, in a control apparatus such as a programmable controller configuring an FA (Factory Automation) system as well, a manual is digitized in a format such as a PDF file. In the digitized manual, besides a setting method and a using method for the control apparatus, a sample program of a language that cannot be described by a simple text such as a ladder language is also described. However, such a sample program cannot be copied and pasted to an engineering tool for performing setting and the like for the control apparatus. Therefore, there is a problem in that, because the sample program needs to be manually input, the manual input takes time and is likely to cause an input mistake.

The present invention has been devised in view of the above and it is an object of the present invention to obtain an electronic-manual browsing apparatus and an electronic-manual browsing system capable of pasting, from an electronic manual to engineering software, a sample program concerning a program language that cannot be described by a simple text.

Solution to Problem

In order to solve the aforementioned problems, an electronic-manual browsing apparatus includes: an electronic-manual-display processing section that displays, on an electronic-manual display screen on a display section, an electronic manual including a sample program concerning a control apparatus; a program-creation-screen-display processing section that displays, on the display section, a program creation screen for creating a program used in the control apparatus; and a program copy section that copies the sample program in the electronic manual selected according to an instruction from a user and temporarily stores the sample program, wherein the program-creation-screen-display processing section pastes the stored sample program in the program creation screen in a format editable on the program creation screen.

Advantageous Effects of Invention

According to the present invention, the sample program in the electronic manual displayed by the electronic-manual-display processing section is pasted on the program creation screen in the form editable by the program-creation-screen-display processing section. Therefore, a user can create a program concerning a control apparatus by diverting the sample program in the electronic manual. As a result, there is an effect that it is possible to reduce time for a manual input and prevent an input mistake.

BRIEF DESCRIPTION OF DRAWINGS

FIG. 3 is a diagram showing an example of a ladder program.

FIG. 6 is a diagram showing an example of a data structure of sample program data according to a second embodiment.

FIG. 9 is a diagram schematically showing an example of the configuration of a sample program.

FIG. 19 is a diagram showing an example of a system-configuration setting screen.

FIG. 20 is a flowchart for explaining an example of a procedure of update processing of a sample program according to the sixth embodiment.

DESCRIPTION OF EMBODIMENTS

Preferred embodiments of an electronic-manual browsing apparatus and an electronic-manual browsing system according to the present invention are explained in detail below with reference to the accompanying diagrams. Note that the present invention is not limited by the embodiments. In the following explanation, as an example, an electronic manual concerning a control apparatus such as a programmable controller is browsed.

First Embodiment

Figure 1:
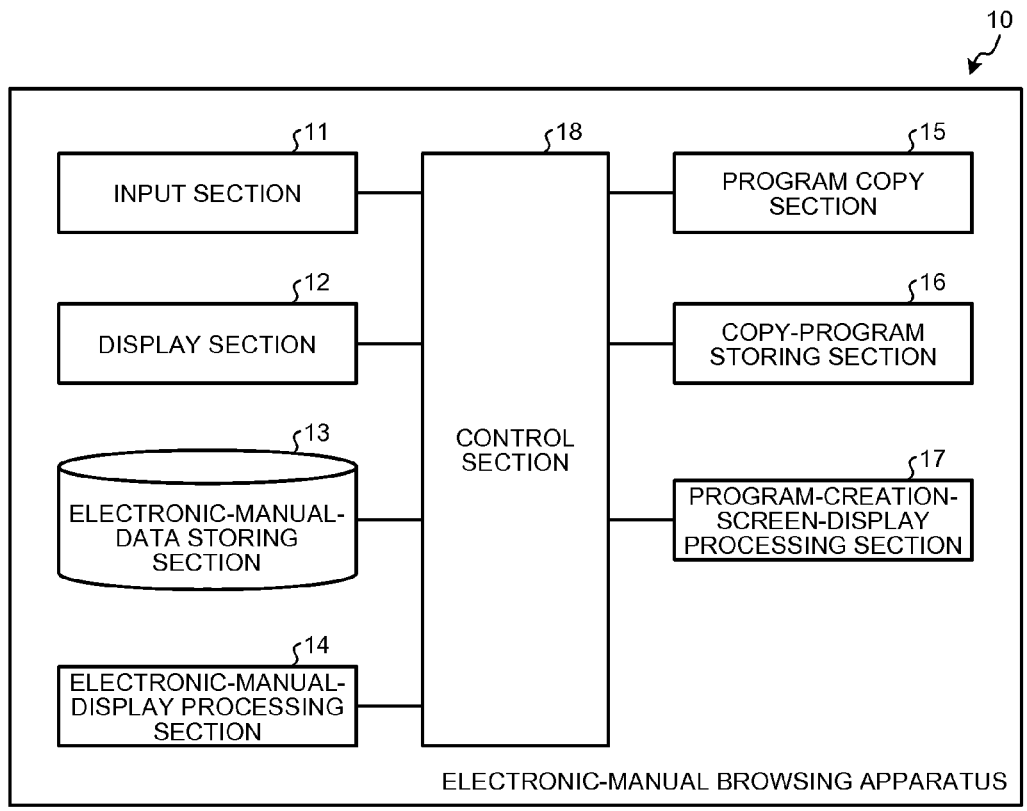
FIG. 1 is a block diagram schematically showing the functional configuration of an electronic-manual browsing apparatus according to a first embodiment.

FIG. 1 is a block diagram schematically showing the functional configuration of an electronic-manual browsing apparatus according to a first embodiment. An electronic-manual browsing apparatus 10 includes an input section 11, a display section 12, an electronic-manual-data storing section 13, an electronic-manual-display processing section 14, a program copy section 15, a copy-program storing section 16, a program-creation-screen-display processing section 17, and a control section 18 that controls these processing sections. Note that only the processing sections necessary in performing copying of a sample program in an electronic manual are shown.

The input section 11 has a function of receiving inputs of a processing command and information to the electronic-manual browsing apparatus 10 from a user. Examples of the input section 11 include a keyboard, a pointing device and the like. The display section 12 has a function with which the electronic-manual browsing apparatus 10 displays content of an electronic manual and content of a program to the user. As an example of the display section 12, a liquid crystal display device can be raised. Note that, as the input section 11 and the display section 12, an input device of a touch panel type obtained by combining the display section 12 and the input section 11 like a tablet terminal can be used.

Figure 2:
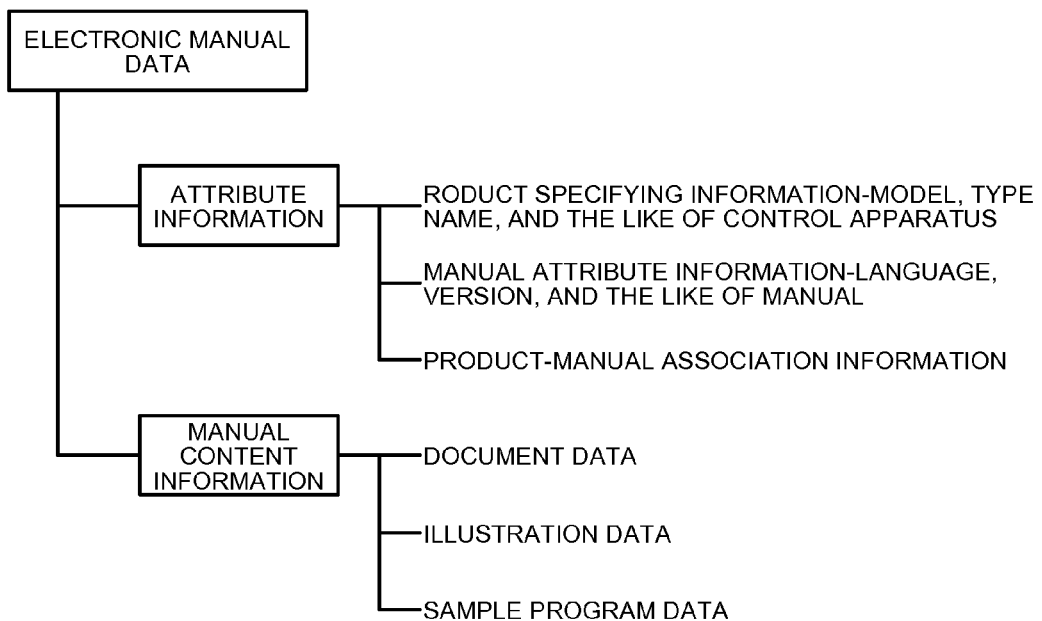
FIG. 2 is a diagram showing an example of the configuration of electronic manual data.

The electronic-manual-data storing section 13 has stored therein electronic manual data of a control apparatus. The electronic manual data is configured in, for example, an EPUB (Electronic Publication) format. FIG. 2 is a diagram showing an example of the configuration of the electronic manual data. The electronic manual data includes attribute information indicating an attribute of the electronic manual data and manual content information including information concerning content of the electronic manual data.

The attribute information includes product specifying information such as a model and a type name of a product of the control apparatus displayed in a model selection menu of the electronic manual, manual attribute information indicating an attribute of the manual such as a language and a version of the manual, product-manual correspondence information for associating the type name in the product specifying information and the electronic manual data. In these kinds of information, manual name IDs, which are peculiar identifiers for specifying the electronic manual data, are included. The manual name IDs are associated with one another. According to the attribute information, when the type name of the product of the control apparatus is selected, the electronic manual data corresponding to the type name can be extracted.

The manual content information includes document data, illustration data, and sample program data. The manual name ID is attached to each of the data. The document data is data representing the content of the electronic manual in the form of a text. The document data includes information for displaying the illustration data and the sample program data. The document data is created by, for example, an XML (Extensible Markup Language). The illustration data is image data displayed in the electronic manual. The sample program is sample program data displayed in the electronic manual. Embedding positions in the document data of the illustration data and the sample program data are specified in the document data. Therefore, when the document data is read and displayed on the display section 12, the illustration data or the sample program data to be specified is read from the manual content information and displayed on the display section 12 according to information such as a size specified by the document data.

Note that the sample program in the first embodiment is a program that cannot be described in the form of a simple text such as a ladder program. In the following explanation, the ladder program is explained as an example of the sample program. A sample program included in an electronic manual of a general control apparatus is a sample program to which image data of the ladder program is pasted. Therefore, even if such image data is pasted to an engineering tool that performs, for example, programming of the control apparatus, editing of a program cannot be performed because content of the program is not obtained. Therefore, in the first embodiment, a sample program that can be represented in a ladder graphic form and is described in the XML format including the content of the program is used.

FIG. 3 is a diagram showing an example of the ladder program. FIG. 3(a) is a diagram showing a general ladder program. FIG. 3(b) is a diagram showing a part of a file in which the ladder program of FIG. 3(a) is described in the XML format. As shown in FIG. 3(a), in a ladder program 300, in general, signs 311 to 316 such as contact signs and coil signs are described between an input side bus 301 and an output side bus 302 and the signs are connected by horizontal connection lines. In FIG. 3(a), function blocks 313 and 314 obtained by schematically simplifying the content of a part of the ladder program 300 are also included.

On the other hand, FIG. 3(b) is a program 320 described in the XML format. The program 320 is content for rendering the ladder program 300 shown in FIG. 3(a) on the display section 12. The program 320 includes not only a visual display description section in which rendering conditions are described but also a content description section in which content of the program is described.

For example, a block 321 is content for describing the input side bus 301 shown in FIG. 3(a). A block 322 is content for describing a contact 311 shown in FIG. 3(a). In the block 322, 'localID="6"' and 'negated="true"' in a row 323 are descriptions concerning the program. 'localID="6"' means an identifier provided at a contact and 'negated="true"' means a B contact. Further, 'width="15"' and 'height="2"' are descriptions concerning rendering. The program 320 described in the XML format in this way includes a visual display description section concerning the rendering and a content description section concerning content of the program. Note that, when the program 320 is described in such an XML format, the structure of the program is defined in XML Schema.

The electronic-manual-display processing section 14 performs processing for displaying, on the display section 12, electronic manual data in the electronic-manual-data storing section 13. For example, the electronic-manual-display processing section 14 can acquire an electronic manual of a desired type name referring to attribute information from the electronic-manual-data storing section 13 and display the electronic manual. The electronic-manual-display processing section 14 has a function of, when a sample program is displayed, reading description concerning rendering of a file described in the XML format and rendering the file on the display section 12.

The program copy section 15 performs processing for copying, in a state in which the sample program in the electronic manual is displayed on the display section 12 by the electronic-manual-display processing section 14, the sample program when a copy instruction for the sample program is issued by the user. Specifically, the program copy section 15 selects a copy target in sample program data and stores the copy target in the copy-program storing section 16. The copy-program storing section 16 temporarily stores the sample program data selected by the program copy section 15.

The program-creation-screen-display processing section 17 performs processing for displaying a program creation screen on the display section 12 separately from the display processing of the electronic manual by the electronic-manual-display processing section 14. The user performs processing such as creation and editing of a program on the program creation screen displayed on the display section 12. The program-creation-screen-display processing section 17 performs processing for reflecting the processing on the display section 12. For example, when the program creation screen is active on the display section 12, the program-creation-screen-display processing section 17 performs processing for reflecting content input from the input section 11 by the user on the program creation screen. Specifically, after the sample program is copied by the program copy section 15, when a pasting command for the sample program is issued, the program-creation-screen-display processing section 17 performs processing for pasting the sample program stored in the copy-program storing section 16 to the program creation screen. When editing of the sample program displayed on the program creation screen is instructed, the program-creation-screen-display processing section 17 performs processing for reflecting the instruction.

Note that the electronic-manual-display processing section 14 is equivalent to, for example, an electronic manual viewer. The program-creation-screen-display processing section 17 is equivalent to an engineering tool that performs processing such as setting of a control system (a control apparatus) and creation of a program used in the control system. The program copy section 15 can be a function implemented on the electronic manual viewer or can be a function implemented on the engineering tool side.

Figure 4:
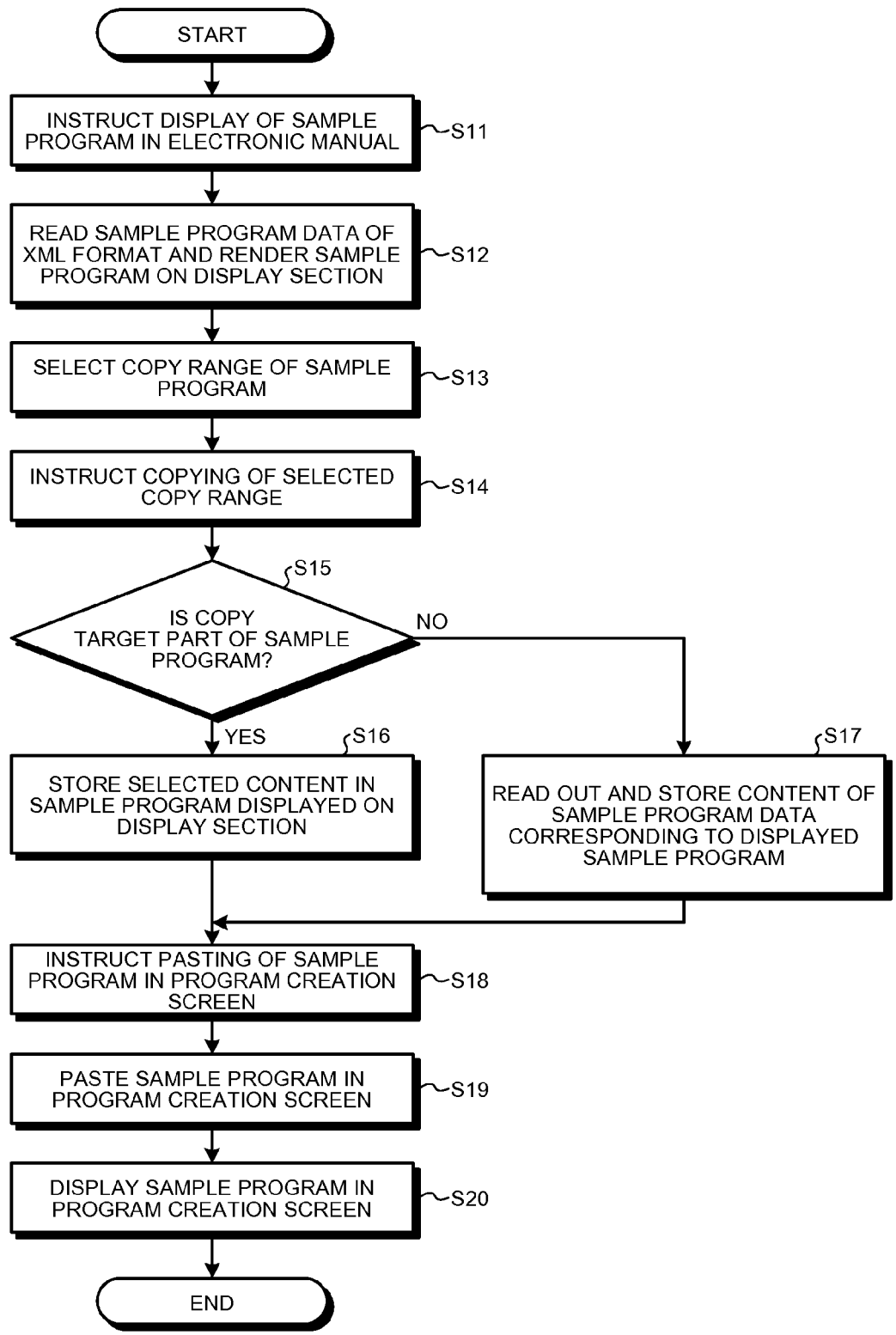
FIG. 4 is a flowchart for explaining an example of a procedure of copy processing of a program according to the first embodiment.
Figure 5:
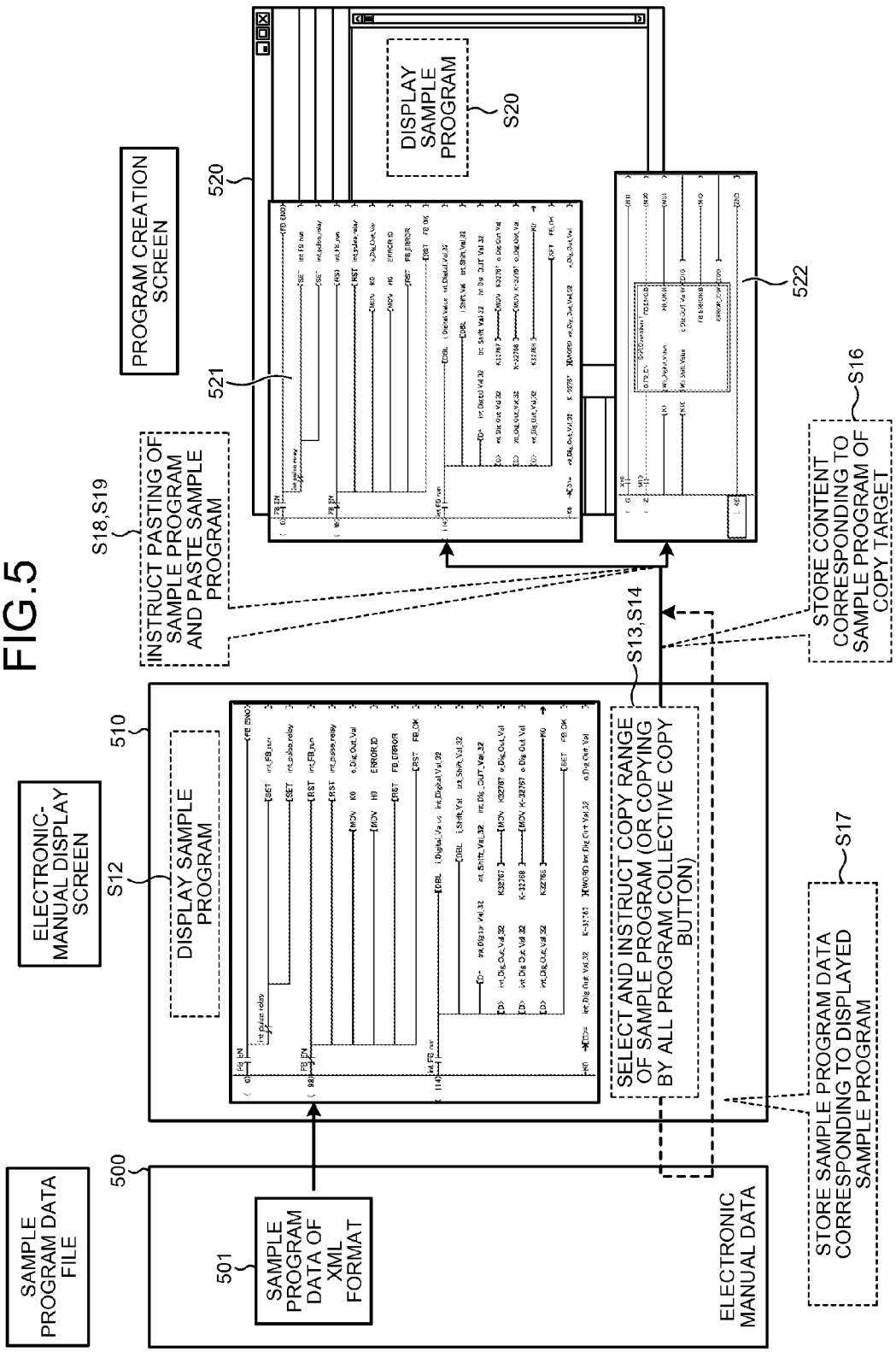
FIG. 5 is a diagram schematically showing the example of the procedure of the copy processing of the program according to the first embodiment.

A copy method for a sample program in the electronic-manual browsing apparatus 10 having such a configuration is explained. FIG. 4 is a flowchart for explaining an example of a procedure of copy processing of a program according to the first embodiment. FIG. 5 is a diagram schematically showing the example of the procedure of the copy processing of the program according to the first embodiment.

First, when display of a sample program in electronic manual data is instructed by an input from the input section 11 by the user (step S11), the electronic-manual-display processing section 14 reads sample program data 501 of the XML format corresponding to the sample program from electronic manual data 500 of the electronic-manual-data storing section 13 and renders the sample program data 501 on the display section 12 (step S12). Consequently, the sample program is displayed on an electronic-manual display screen 510.

Subsequently, the user selects, via the input section 11, a range of copying of the sample program on the electronic-manual display screen 510 displayed on the display section 12 (step S13), and copying of the selected range of the sample program is instructed (step S14). The program copy section 15 determines whether or not a copy target is a part of the sample program (step S15). That is, the program copy section 15 determines whether a part of the sample program displayed on the display section 12 is selected or the entire sample program is selected.

When the copy target is a part of the sample program (Yes at step S15), the program copy section 15 temporarily stores, in the copy-program storing section 16, selected content in the sample program displayed on the display section 12 (step S16).

When the copy target is not a part of the sample program, that is, when the copy target is the entire sample program (No at step S15), the program copy section 15 temporarily stores, in the copy-program storing section 16, content of a file (sample program data) corresponding to the displayed sample program from the electronic-manual-data storing section 13 (step S17).

Thereafter or after step S16, the user instructs, via the input section 11, processing for pasting the copied sample program onto the program creation screen 520 (step S18). The program-creation-screen-display processing section 17 performs processing for pasting the sample program stored in the copy-program storing section 16 in a position designated by the user on the program creation screen 520 displayed on the display section 12 (step S19). The program-creation-screen-display processing section 17 reads the copied file of the XML format and displays, for example, programs 521 and 522 of a ladder format on the program creation screen 520 (step S20). Consequently, the copy processing of the sample program ends, and the user is enabled to optionally edit the pasted sample program on the program creation screen 520.

Note that, when the sample program is pasted and displayed on the program creation screen 520 at step S19, the user may be enabled to select whether the sample program is still displayed as the ladder program 521 or is converted into a function block 522 and displayed. When the sample program is converted into the function block 522, a function block corresponding to the sample program to be copied has only to be registered in advance. The program-creation-screen-display processing section 17 has, when the function block corresponding to the sample program to be displayed is registered, only to convert a portion of the sample program corresponding to the function block into the function block 522 and display the portion.

Conventionally, in general, an electronic manual of a control apparatus or the like is a file in a PDF (Portable Document Format) of a manual created by a normal paper medium. When a sample program of the control apparatus included in the electronic manual is, for example, a ladder program, the ladder program is shown as a figure and is not a format for allowing editing of a program. The same holds true concerning a program of a language in general that cannot be described by a simple text used in the control apparatus or the like. That is, sample program data included in the conventional electronic manual is visually represented, and content of a program cannot be edited using the data. Therefore, a user performs processing for creating a program on a program creation screen while referring to the data converted into an image.

On the other hand, in the first embodiment, the sample program configured by the language that cannot be described by the simple text included in the electronic manual of the control apparatus is described in the file of the XML format including the description rendered on the display section 12 and the content such as parameters in the program. Consequently, when the sample program in the electronic manual is displayed on the display section 12, after the sample program is selected and pasted to the program creation screen in the display section 12 as the program, it is made possible to edit the pasted sample program on the program creation screen. Therefore, there is an effect that the user can create the program by editing the sample program copied from the electronic manual and pasted using the electronic-manual browsing apparatus 10. The user can create the program concerning the control apparatus by diverting the sample program in the electronic manual. Therefore, there is an effect that it is made possible to reduce time for a manual input and prevent an input mistake.

Note that, in the example explained above, the sample program of the XML format is used. However, sample programs of format of other markup language can be used as long as content and the like of a program used in the control apparatus can be defined and content of the program can be rendered.

Second Embodiment

In the example explained in the first embodiment, the ladder program in the electronic manual is described as the file of the XML format. In the following explanation in a second embodiment, a ladder program in an electronic manual is configured by data for display on a display section and data indicating content of an actual program.

FIG. 6 is a diagram showing an example of a data structure of sample program data according to the second embodiment. Sample program data 130 is actual content of a sample program displayed in an electronic manual and includes program data 131 of a binary format. The sample program data 130 includes, as illustration data 132 of electronic manual data, data for program display 133 that is image data for visually displaying the sample program in the electronic manual. In this way, the data for program display 133 and the program data 131 are configured by separate files and associated with each other. For example, two data (files) can be associated with each other in attribute information or can be associated by defining program data corresponding to illustration data in document data. When the sample program is displayed on the display section 12 by the electronic-manual-display processing section 14, the data for program display 133, which is the illustration data 132, is used. When the sample program is copied, the program data 131 associated with the displayed data for program display 133 is copied.

The configuration of an electronic-manual browsing apparatus in the second embodiment is the same as the configuration of the electronic-manual browsing apparatus in the first embodiment. However, when displaying the sample program of the electronic manual, the electronic-manual-display processing section 14 reads and displays the data for program display 133. When receiving an instruction for copying of the sample program from the input section 11, the program copy section 15 extracts, from the electronic-manual-data storing section 13, the program data 131 corresponding to the currently-displayed data for program display 133 and stores the program data 131 in the copy-program storing section 16. Note that, in the second embodiment, the data for program display 133 is image data, and information concerning displayed content cannot be selected. Therefore, a user selects the entire sample program as a copying range.

Further, the program-creation-screen-display processing section 17 has a function of converting the program data 131, which is not described in an image format, into a program of a format such as a ladder program and displaying the program. When an instruction for pasting the program data 131 stored in the copy-program storing section 16 to a program creation screen is issued, the program-creation-screen-display processing section 17 performs processing for pasting the ladder program generated from the program data 131 to a predetermined position on the program creation screen. Note that, because the other components are the same as the components in the first embodiment, explanation of the components is omitted.

Figure 7:
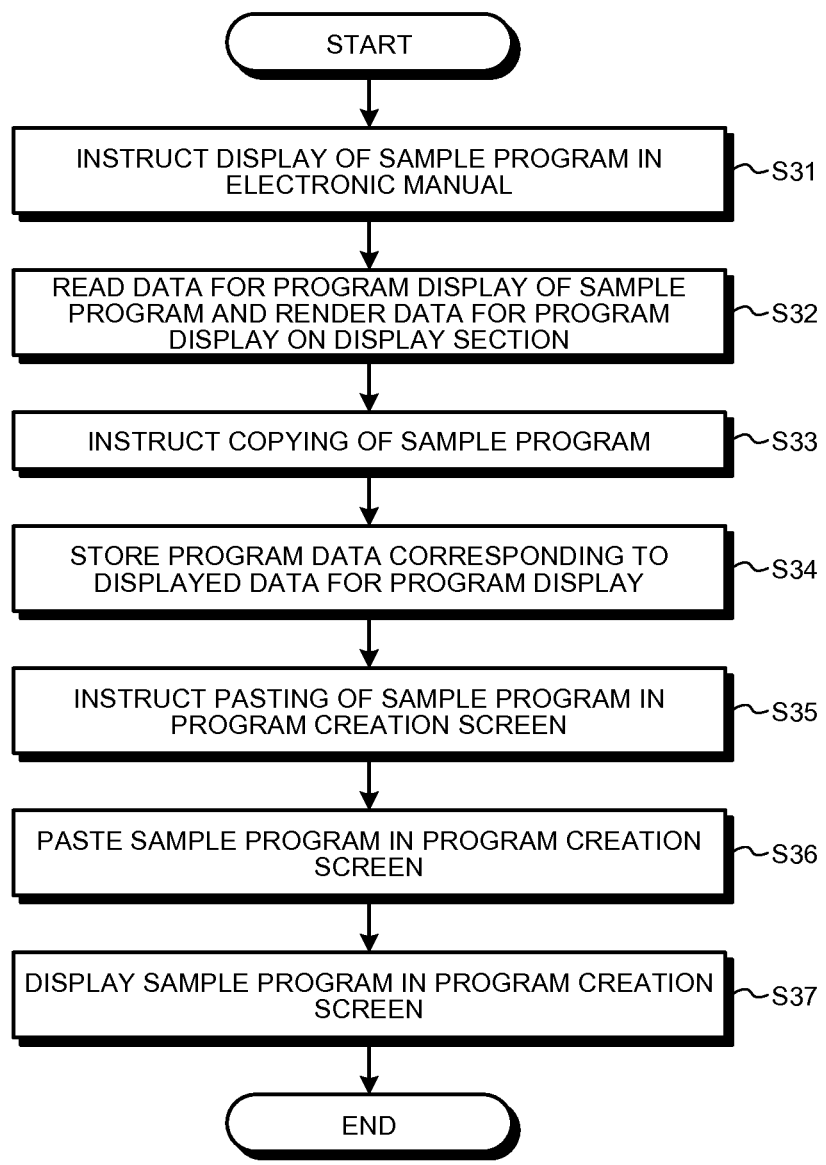
FIG. 7 is a flowchart for explaining an example of a procedure of copying processing of a program according to the second embodiment.
Figure 8:
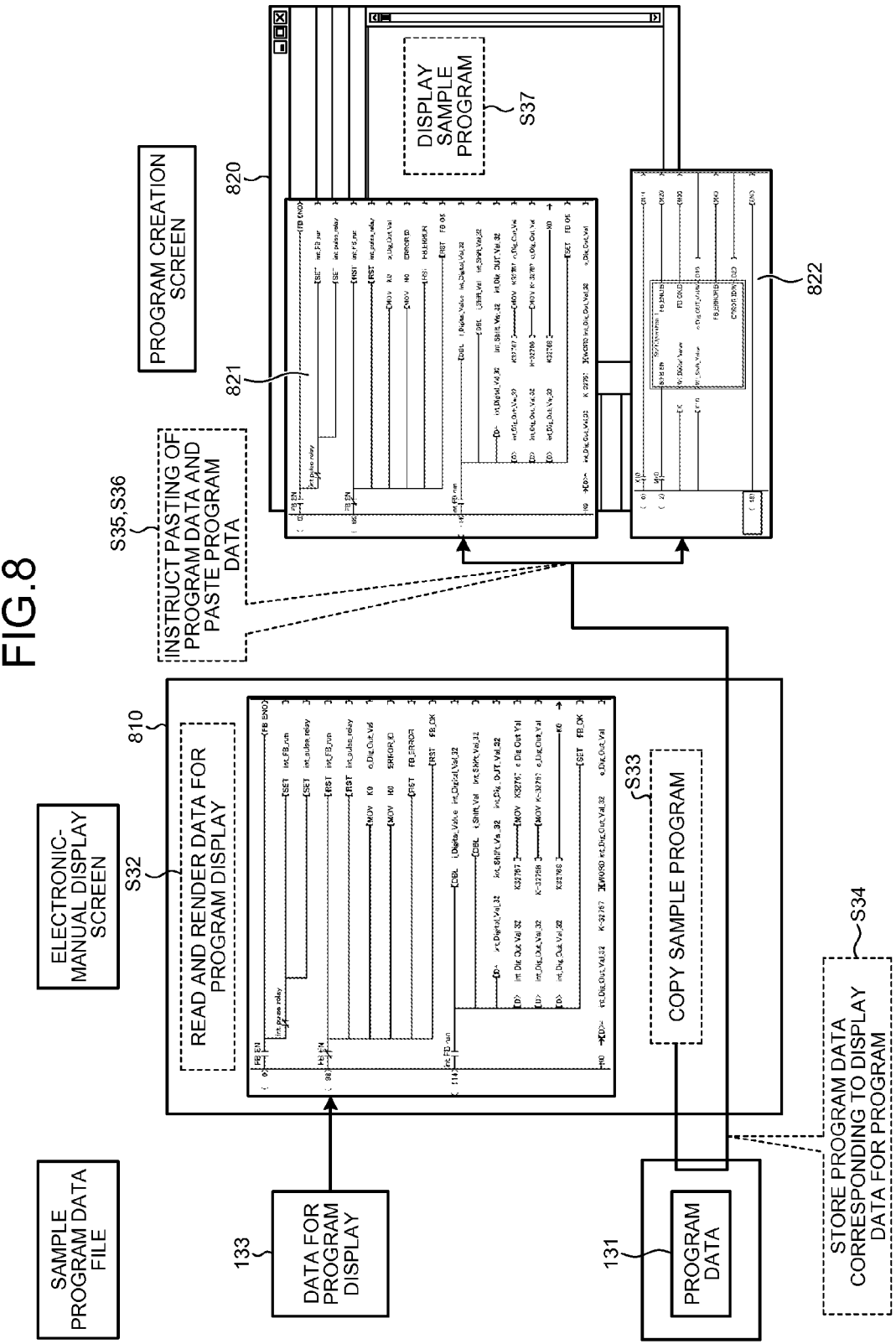
FIG. 8 is a diagram schematically showing the example of the procedure of the copy processing of the program according to the second embodiment.

A copy method for a sample program in the electronic-manual browsing apparatus having such a configuration is explained. FIG. 7 is a flowchart for explaining an example of a procedure of copy processing of a program according to the second embodiment. FIG. 8 is a diagram schematically showing the example of the procedure of the copy processing of the program according to the second embodiment.

First, when display of a sample program in an electronic manual is instructed by an input from the input section 11 by the user (step S31), the electronic-manual-display processing section 14 reads, from the electronic-manual-data storing section 13, data for program display 133 of the corresponding sample program and renders the data for program display 133 on the display section 12 (step S32). Consequently, an electronic-manual display screen 810 is displayed on the display section 12.

Subsequently, the user instructs, via the input section 11, copying of the sample program displayed on the electronic-manual display screen 810 of the display section 12 (step S33). A target of the copying is the entire sample program.

Thereafter, the program copy section 15 reads out, from the electronic-manual-data storing section 13, the program data 131 corresponding to the data for program display 133 displayed on the display section 12 and stores the program data 131 in the copy-program storing section 16 (step S34).

Subsequently, the user instructs, via the input section 11, processing for pasting the copied program data 131 onto the program creation screen 820 (step S35). The program-creation-screen-display processing section 17 performs processing for pasting the program data 131 of the sample program stored in the copy-program storing section 16 to a position designated by the user on the program creation screen 820 displayed on the display section 12 (step S36). At this time, the program-creation-screen-display processing section 17 reads the copied program data 131 of the binary format, converts the program data 131 into a ladder program, and displays ladder program 821 on the program creation screen 820 (step S37). Consequently, the copy processing of the sample program ends.

Note that, when the program-creation-screen-display processing section 17 causes the display section 12 to display the program data 131 in step S37, the program-creation-screen-display processing section 17 may cause the user to select whether the program data 131 is displayed as the ladder program 821 or a part of the program data 131 is converted into a function block 822 and displayed.

Note that, in the above explanation, the program data 131 is binary data. However, the program data 131 can be text data. In the above explanation, the data for program display 133 and the program data 131 are associated as separate files. However, when the program data 131 is the binary data, the data for program display 133 and the program data 131 can be integrated as one file.

FIG. 9 is a diagram schematically showing an example of the configuration of the sample program. FIG. 9(a) shows a case in which the sample program data 130 is program data 131a of a text format. In this case as well, as shown in FIG. 6, the data for program display 133, which is image data corresponding to the program data 131a, is prepared in the illustration data 132 of the manual content information.

In FIGS. 9(b) and 9(c), the sample program data 130 (a file) is configured by data for program display 134b, which is image data for visualizing and displaying the sample program, and program data 131b, which is content of the sample program. A difference between FIGS. 9(b) and 9(c) is arrangement order of the data in the sample program data 130 (the file). In these cases, when displaying the sample program, the electronic-manual-display processing section 14 reads the data for program display 134b in the sample program data 130. Therefore, it is unnecessary to prepare data for program display in illustration data as shown in FIG. 6 and FIG. 9(a). When instructed to copy the sample program, the program copy section 15 copies the program data 131b in the sample program data 130.

According to the second embodiment, it is possible to obtain effects same as the effects in the first embodiment.

Third Embodiment

In the first and second embodiments, the method of copying the sample program configured by the program created in the program language that cannot be described by the simple text is explained. In a third embodiment, a method of copying a sample program, which is a text program described by a text, is explained.

The sample program to be copied in the third embodiment is a text program represented by a Structured Text (ST) format, an Instruction List (IL) format, or the like.

The configuration of an electronic-manual browsing apparatus in the third embodiment is the same as the configuration of the electronic-manual browsing apparatus in the first embodiment. However, when attribute information indicating a format of a text program is included in a tag of a copied text program, the program copy section 15 copies the attribute information as well. When the attribute information is not included, the program copy section 15 copies attribute information selected via the input section 11 by the user. Examples of the method of selection include a method of providing, in a position where the sample program is inserted in document data, a button indicating attribute information (an ST format, an IL format, or the like) of the text program and, when copying the sample program, causing the user to select the button, and a method of displaying, when selecting the sample program, an extended menu for enabling selection of a format of the text program on an electronic-manual display screen and causing the user to select a format of the text program out of the extended menu.

The program-creation-screen-display processing section 17 has a function of displaying the copied text program on the program creation screen in a text format or a ladder program format. In this case, the text program is interpreted according to attribute information added to the text program. Note that, because the other components are the same as the components in the first embodiment, explanation of the components is omitted.

Figure 10:
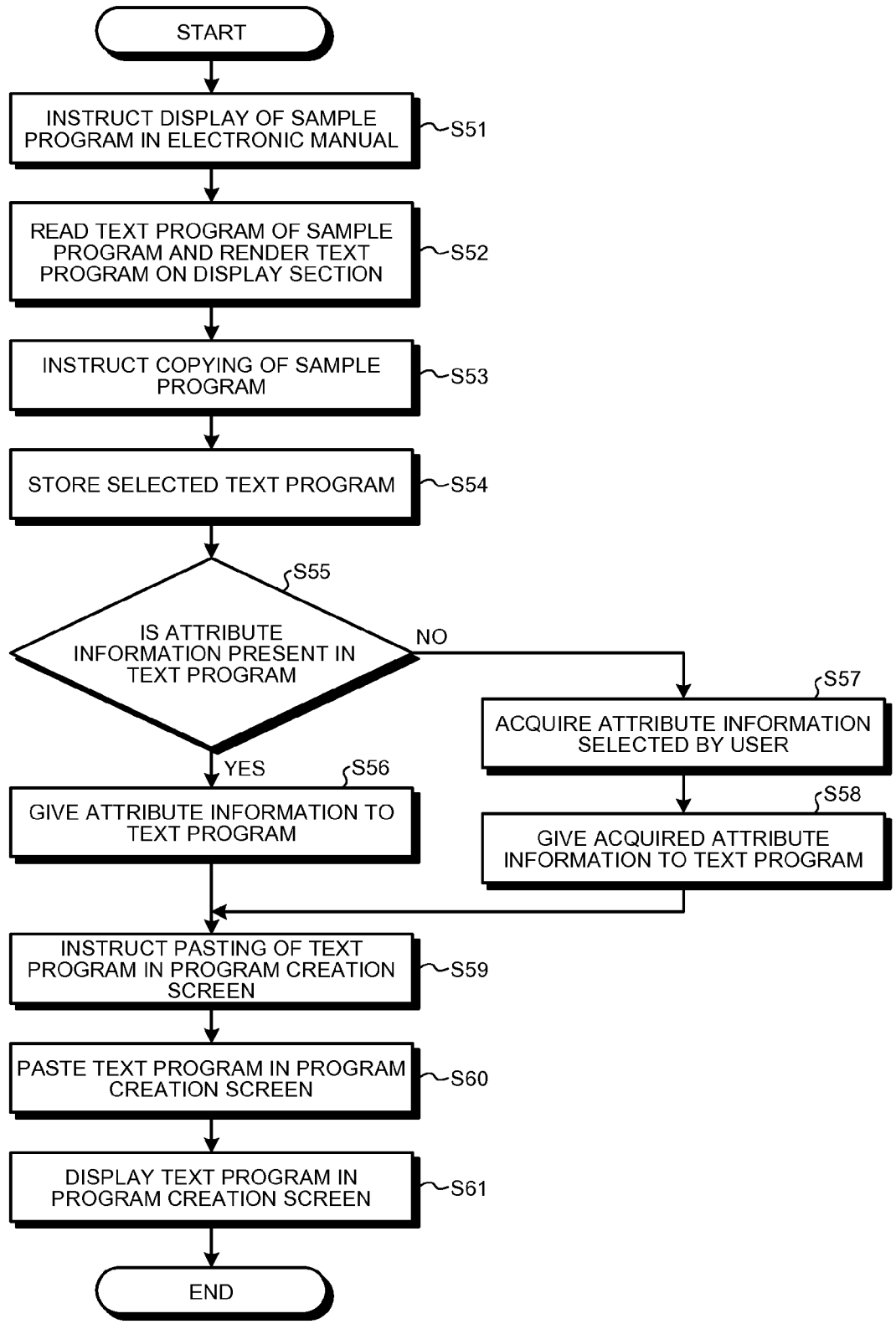
FIG. 10 is a flowchart for explaining an example of a procedure of copy processing of a program according to a third embodiment.
Figure 11:
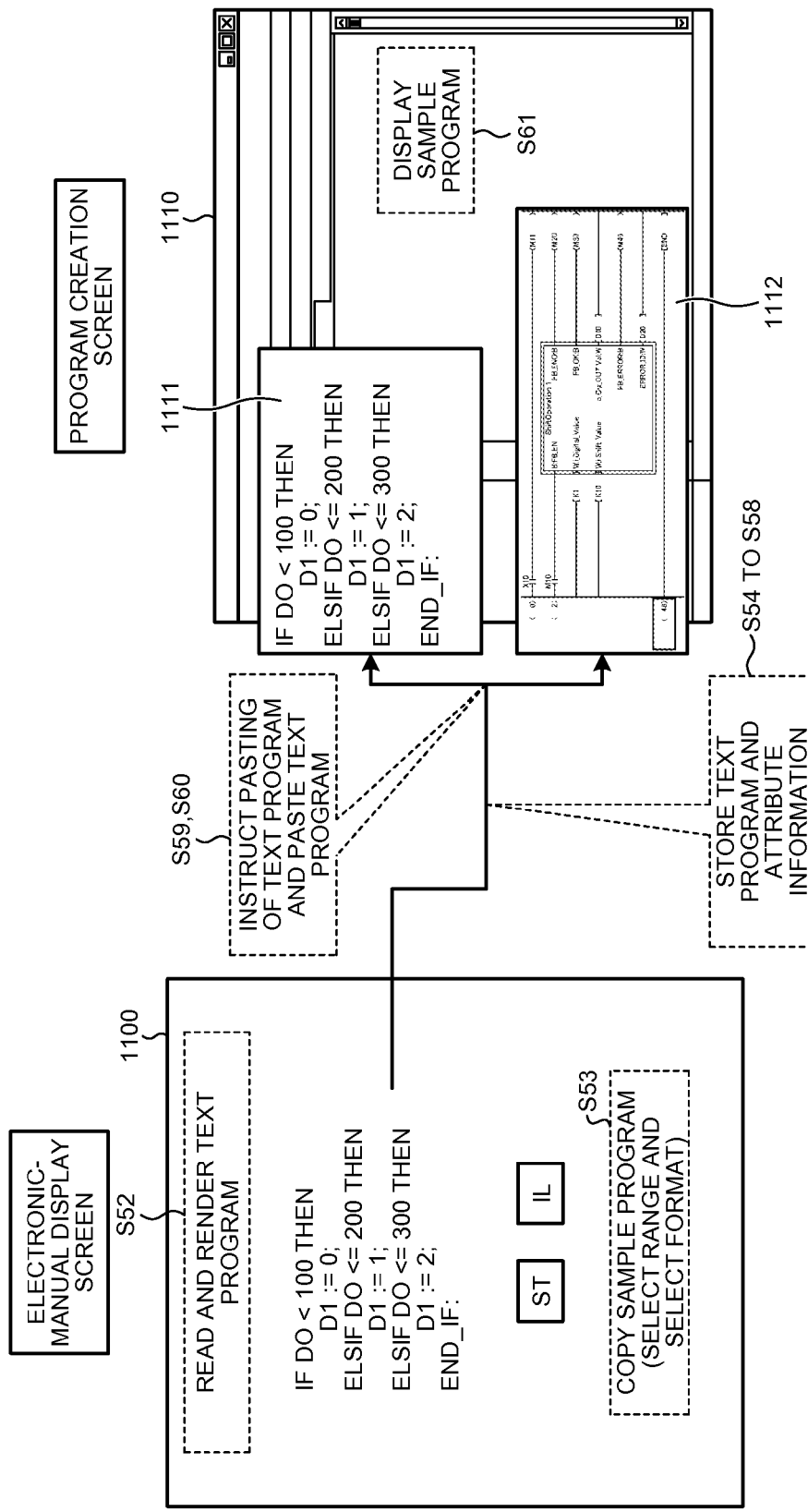
FIG. 11 is a diagram schematically showing the example of the procedure of the copy processing of the program according to the third embodiment.

A copy method for a sample program in the electronic-manual browsing apparatus having such a configuration is explained. FIG. 10 is a flowchart for explaining an example of a procedure of copy processing of a program according to the third embodiment. FIG. 11 is a diagram schematically showing the example of the procedure of the copy processing of the program according to the third embodiment.

First, when display of a sample program in an electronic manual is instructed by an input from the input section 11 by the user (step S51), the electronic-manual-display processing section 14 reads, from the electronic-manual-data storing section 13, a text program of the corresponding sample program and renders the text program on the display section 12 (step S52). Consequently, a sample program of a text format is displayed on an electronic-manual display screen 1100.

Subsequently, the user instructs, via the input section 11, copying of the sample program displayed on the display section 12 (step S53). A target of the copying can be the entire sample program or a part of the sample program.

Thereafter, the program copy section 15 stores, in the copy-program storing section 16, the text program displayed on the display section 12 and selected by the user (step S54).

The program copy section 15 determines whether attribute information is included in the copied text program (step S55). When the attribute information is included (Yes at step S55), the attribute information is given to the text program (step S56). When the attribute information is not included (No at step S55), the program copy section 15 acquires attribute information of the text program selected by the user (step S57). The attribute information is given to the text program (step S58).

Thereafter or after step S56, the user instructs, via the input section 11, processing for pasting the copied sample program (text program) onto a program creation screen 1110 (step S59). The program-creation-screen-display processing section 17 performs processing for pasting the text program of the sample program stored in the copy-program storing section 16 in a position designated by the user on the program creation screen 1110 displayed on the display section 12 (step S60). The program-creation-screen-display processing section 17 reads the copied text program, reads attribute information of the text program, and displays a program on the program creation screen 1110 (step S61). In this case, the program-creation-screen-display processing section 17 can directly display a text program 1111 or can discriminate a format of the text program using the attribute information, convert the read text program on the basis of a result of the discrimination, and display the text program as a ladder program 1112 including a ladder program or a function block. Consequently, the copy processing of the sample program ends.

According to the third embodiment, it is made possible to obtain effects same as the effects in the first embodiment.

Fourth Embodiment

A fourth embodiment is a method of generating a ladder program from image data of a sample program included in an electronic manual.

Figure 12:
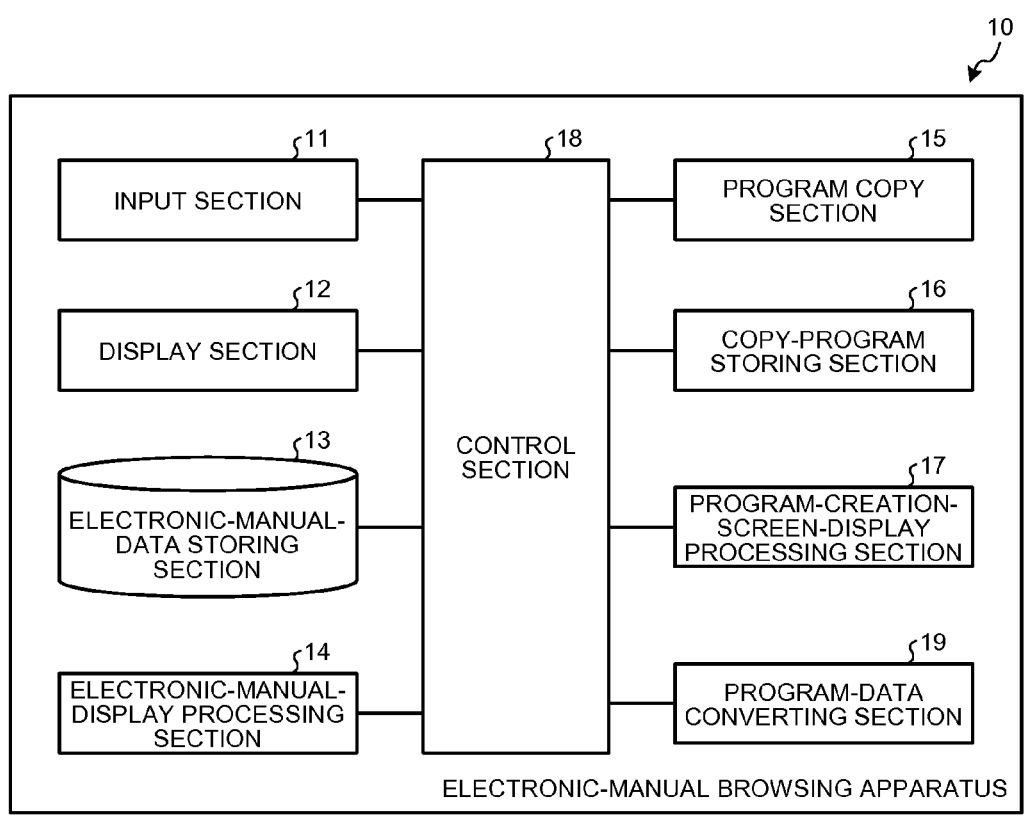
FIG. 12 is a block diagram schematically showing the functional configuration of an electronic-manual browsing apparatus according to a fourth embodiment.

FIG. 12 is a block diagram schematically showing the functional configuration of an electronic-manual browsing apparatus according to the fourth embodiment. The electronic-manual browsing apparatus 10 according to the fourth embodiment further includes, in the electronic-manual browsing apparatus 10 in the first embodiment, a program-data converting section 19 that reads data for program display, which is image data of a sample program copied by the program copy section 15, and converts the data for program display into program data.

The program-data converting section 19 performs OCR (Optical Character Recognition)-like processing. That is, the program-data converting section 19 performs processing for components of the data for program display, which is copied by the program copy section 15, in order from a higher horizontal connection line of the data for program display. For example, the program-data converting section 19 sequentially discriminates, concerning the top horizontal connection line, from the left to right, components such as an input side bus, a horizontal connection line, signs (contact signs, coil signs, and the like), and characters described on the signs and creates a program. The program-data converting section 19 performs, concerning horizontal connection lines of the ladder program in a selected range, processing for performing the discrimination processing in the same manner concerning the next horizontal connection line when reaching an output side bus on the right side. Note that the program to be created can be a ladder program assembled using components same as the components of the ladder program indicated by reading source image data, can be a text program of an IL format or an ST format in which the read signs are converted into a processing command, or can be programs of other formats. The conversion processing of the program by the program-data converting section 19 can be performed after the data for program display is stored in the copy-program storing section 16 or can be performed after a pasting instruction is issued via the input section 11 by the user.

The electronic-manual-data storing section 13 retains, as illustration data, the data for program display obtained by converting the sample program into an image. However, the electronic-manual-data storing section 13 does not retain sample program data, which is content of the sample program.

The copy-program storing section 16 temporarily stores the data for program display copied by the program copy section 15 and stores the program data converted by the program-data converting section 19.

The program-creation-screen-display processing section 17 has a function of pasting the program data converted by the program-data converting section 19 and stored in the copy-program storing section 16 onto the program creation screen of the display section 12. Note that, because the other components are the same as the components in the first embodiment, explanation of the components is omitted.

Figure 13:
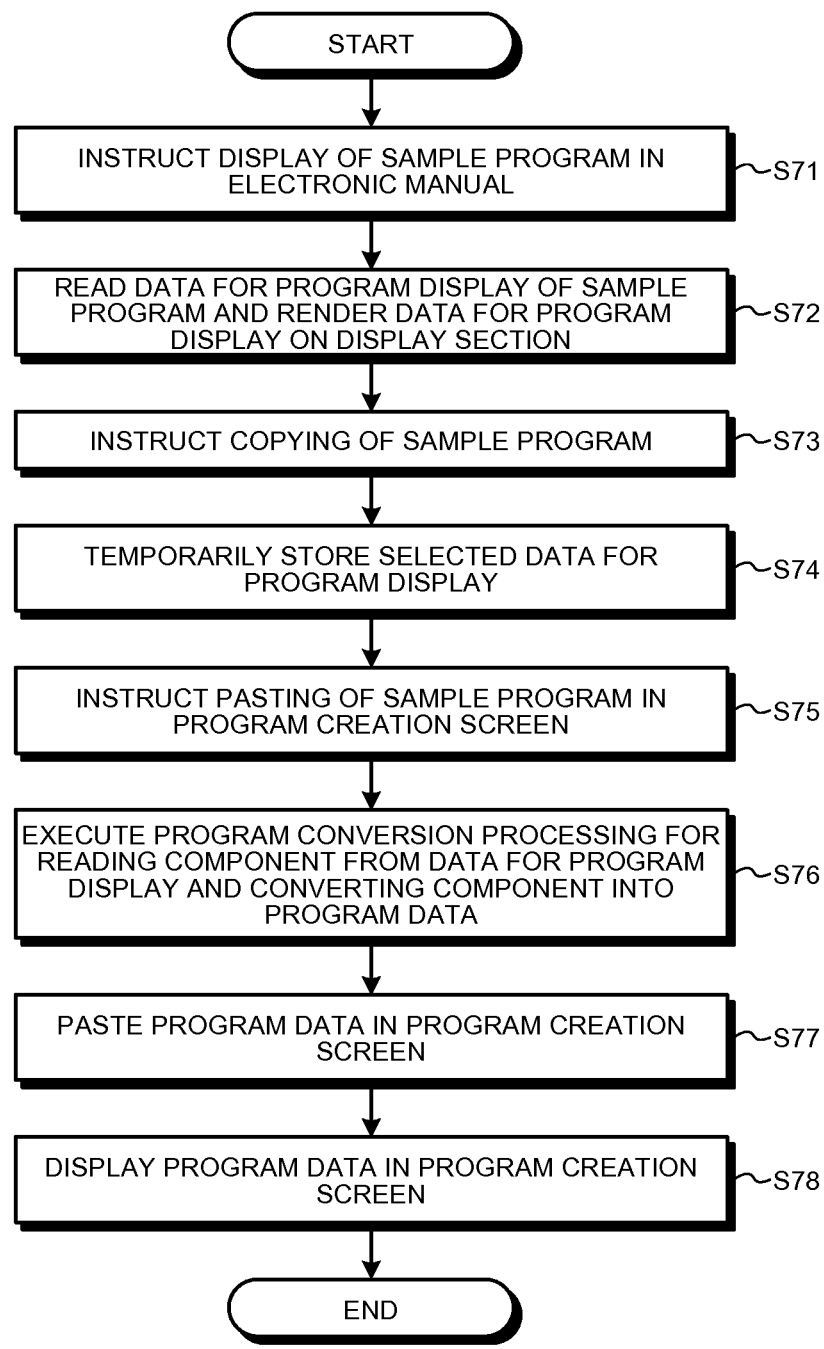
FIG. 13 is a flowchart for explaining an example of a procedure of copy processing of a program according to the fourth embodiment.
Figure 14:
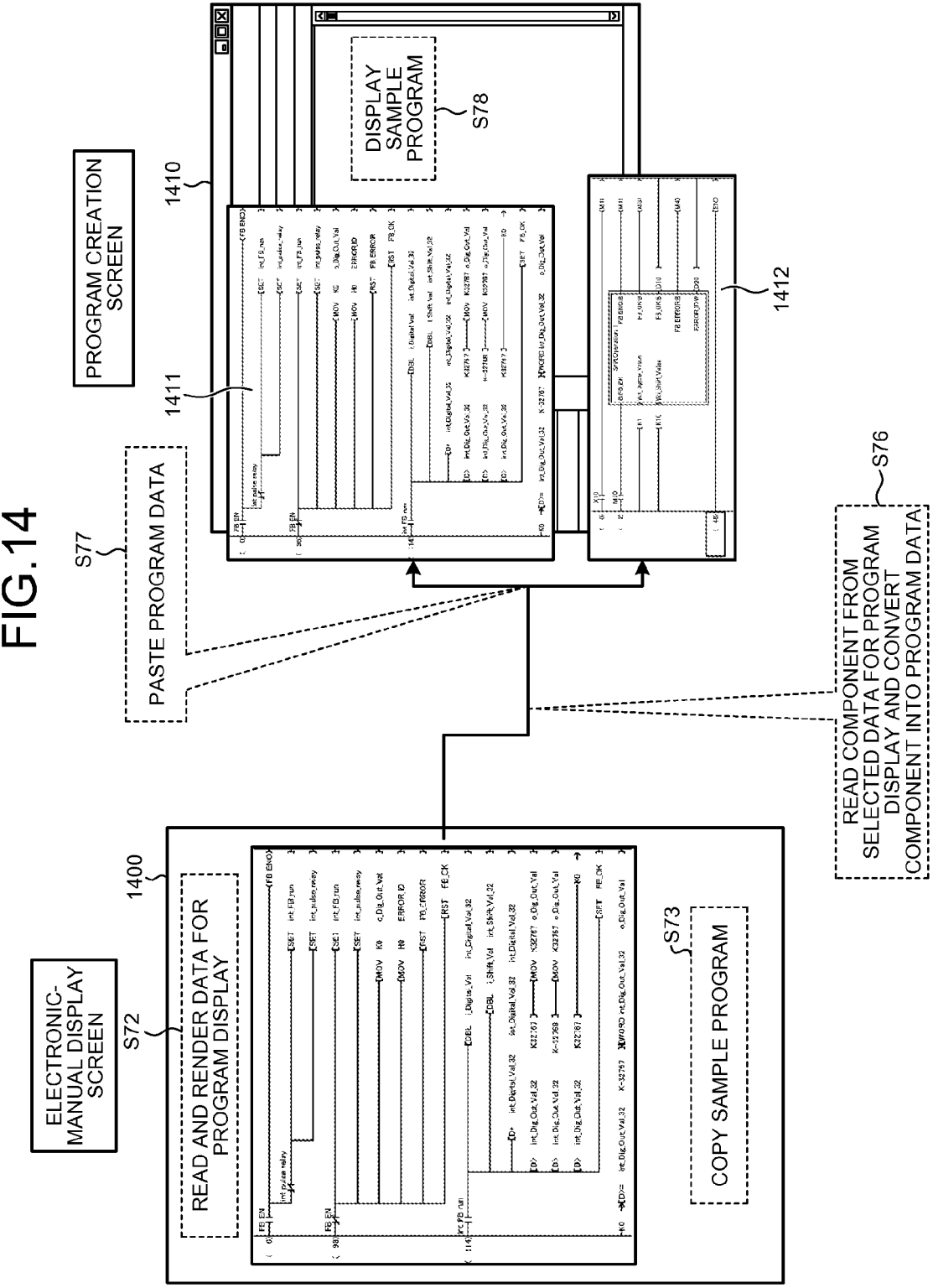
FIG. 14 is a diagram schematically showing the example of the procedure of the copy processing of the program according to the fourth embodiment.

A copy method for a sample program in the electronic-manual browsing apparatus having such a configuration is explained. FIG. 13 is a flowchart for explaining an example of a procedure of copy processing of a program according to the fourth embodiment. FIG. 14 is a diagram schematically showing the example of the procedure of the copy processing of the program by the fourth embodiment.

First, when display of a sample program in an electronic manual is instructed by an input from the input section 11 by the user (step S71), the electronic-manual-display processing section 14 reads, from the electronic-manual-data storing section 13, data for program display of the corresponding sample program and renders the data for program display on the display section 12 (step S72). Consequently, the data for program display is displayed on an electronic-manual display screen 1400.

Subsequently, the user instructs, via the input section 11, copying of the sample program displayed on the display section 12 (step S73). The target of the copying can be the entire sample program or a part of the sample program.

Thereafter, the program copy section 15 copies image data of the sample program displayed on the display section 12 and selected by the user and temporarily stores the image data in the copy-program storing section 16 (step S74).

Subsequently, the user instructs, via the input section 11, processing for pasting the copied sample program onto a program creation screen 1410 (step S75). When receiving the instruction for the pasting processing, the program-data converting section 19 performs, concerning a ladder program included in the data for program display copied by the program copy section 15, in units of one horizontal connection line, program conversion processing for sequentially reading components in order from the top horizontal connection line and converting the components into a program (step S76). Converted program data is stored in the copy-program storing section 16. Note that the conversion into the program can be executed after the data for program display is stored in the copy-program storing section 16 rather than being executed after the pasting processing is instructed.

Thereafter, the program-creation-screen-display processing section 17 performs processing for pasting the program data of the sample program converted by the program-data converting section 19 in a position designated by the user on the program creation screen 1410 displayed on the display section 12 (step S77). The program-creation-screen-display processing section 17 displays the program data acquired from the program-data converting section 19 on the program creation screen 1410 of the display section 12 (step S78). In this case, when displaying the program data on the program creation screen 1410, the program-creation-screen-display processing section 17 can display a ladder program 1411 converted according to the instruction from the user while keeping a format of the ladder program 1411 or can convert the ladder program 1411 into a ladder program 1412 including a function block and display the ladder program 1412. Consequently, the copy processing of the sample program ends.

According to the fourth embodiment, it is possible to obtain effects same as the effects in the first embodiment.

Fifth Embodiment

A fifth embodiment is a method of generating a ladder program from image data of a sample program included in an electronic manual as in the fourth embodiment.

The configuration of an electronic-manual browsing apparatus in the fifth embodiment is the same as the configuration of the electronic-manual browsing apparatus in the first embodiment. Therefore, explanation of the configuration of the electronic-manual browsing apparatus is omitted. However, in the fifth embodiment, as sample program data stored in the electronic-manual-data storing section 13, data for program display to which a program is embedded (hereinafter may be referred to just as "program-attached data for program display") is used, in which program data, which is content of a program, is embedded in data for program display for visually displaying a sample program by a method of electronic watermark.

Figure 15:
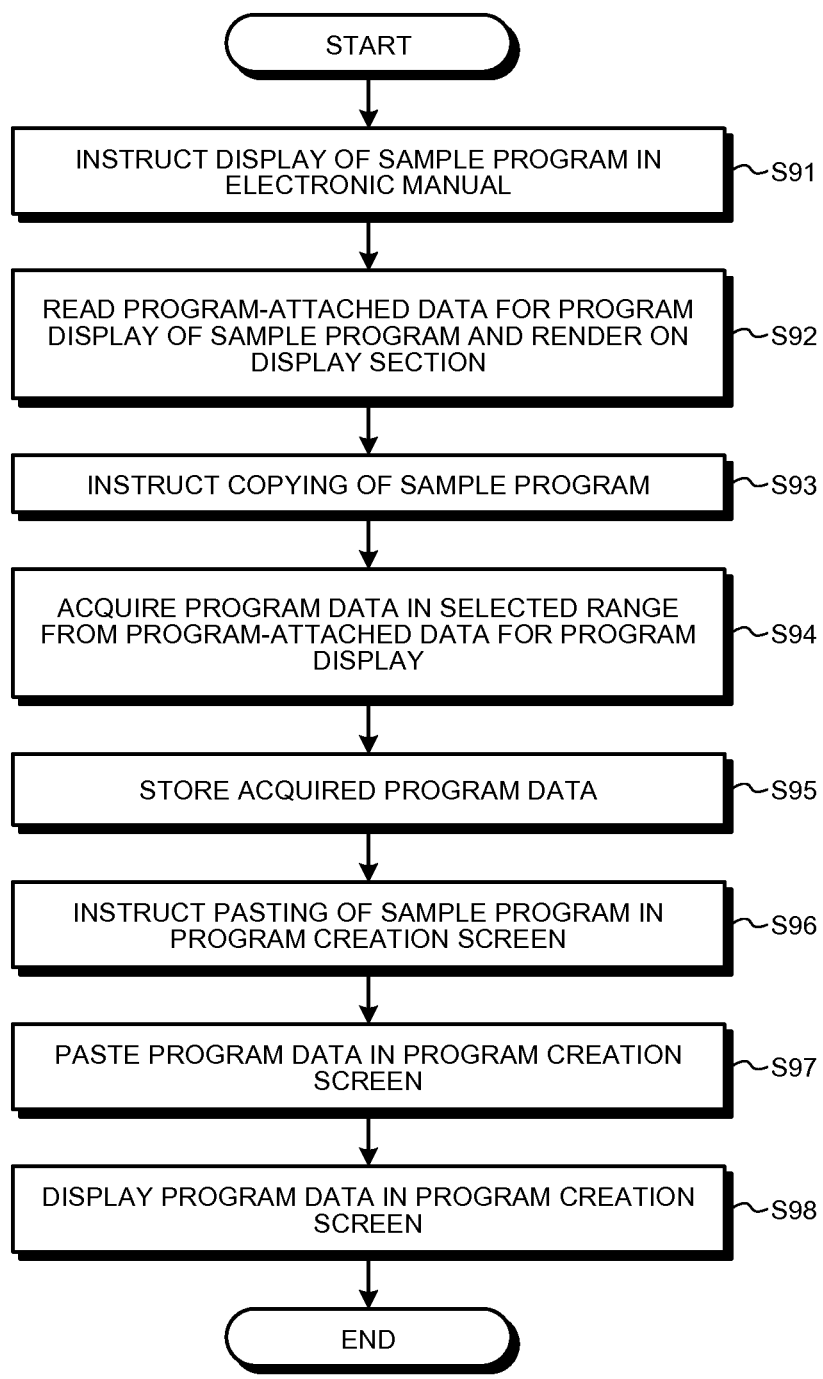
FIG. 15 is a flowchart for explaining an example of a procedure of copy processing of a program according to a fifth embodiment.
Figure 16:
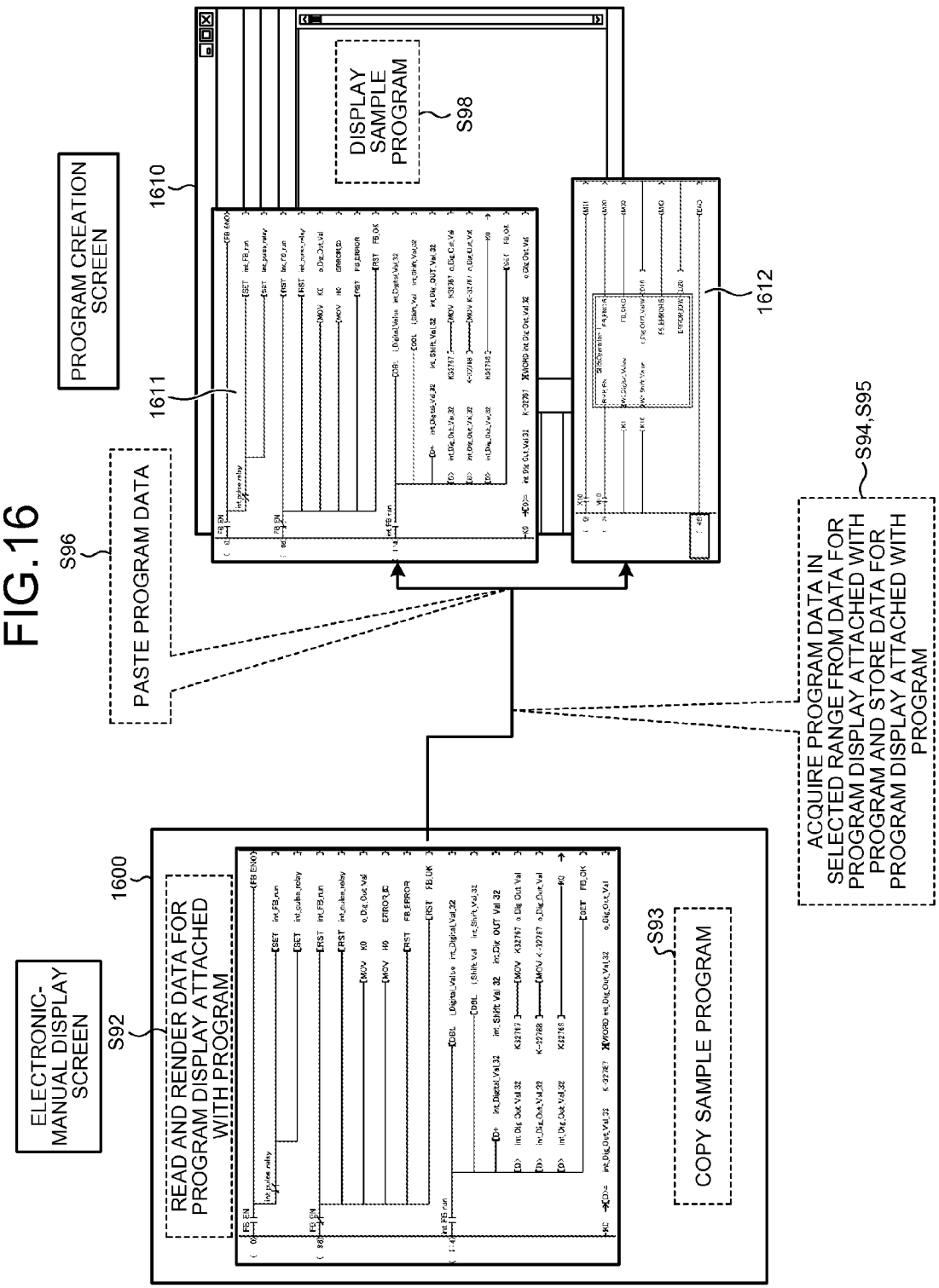
FIG. 16 is a diagram schematically showing the example of the procedure of the copy processing of the program according to the fifth embodiment.

A copy method for a sample program in the electronic-manual browsing apparatus having such a configuration is explained. FIG. 15 is a flowchart for explaining an example of a procedure of copy processing of a program according to the fifth embodiment. FIG. 16 is a diagram schematically showing the example of the procedure of the copy processing of the program by the fifth embodiment.

First, when display of a sample program in an electronic manual is instructed by an input from the input section 11 by a user (step S91), the electronic-manual-display processing section 14 reads, from the electronic-manual-data storing section 13, program-attached data for program display to which a program of the corresponding sample program is embedded and renders the program-attached data for program display is on the display section 12 (step S92). Consequently, an electronic-manual display screen 1600 having the program-attached data for program display is displayed on the display section 12.

Subsequently, the user instructs, via the input section 11, copying of the sample program displayed on the display section 12 (step S93). The target of the copying can be the entire sample program or a part of the sample program.

Thereafter, the program copy section 15 acquires, from the program-embedded data for program display, program data included in a range selected by the user (step S94) and stores the acquired program data in the copy-program storing section 16 (step S95). In this case, the program copy section 15 acquires program data corresponding to the range selected by the user, among the program data embedded in the data for program display to which the program is attached.

Subsequently, the user instructs, via the input section 11, processing for pasting the copied sample program onto a program creation screen 1610 (step S96). Thereafter, the program-creation-screen-display processing section 17 performs processing for pasting the program data of the sample program stored in the copy-program storing section 16 in a position designated by the user on the program creation screen 1610 displayed on the display section 12 (step S97).

The program-creation-screen-display processing section 17 displays the program data acquired from the program-data converting section 19 in the program creation screen 1610 (step S98). In this case, the program-creation-screen-display processing section 17 can display the copied program data as a ladder program 1611, can display the copied program data as a ladder program 1612 including a function block, or can display the copied program data in other formats. Consequently, the copy processing of the sample program ends.

According to the fifth embodiment, it is possible to obtain effects same as the effects in the first embodiment.

Figure 17:
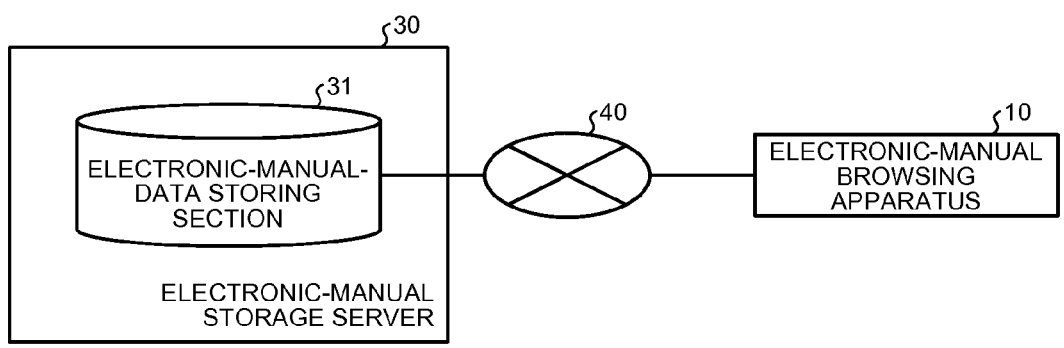
FIG. 17 is a block diagram schematically showing an example of the configuration of an electronic-manual browsing system.

Note that the first to fifth embodiments are based on the premise that the electronic manual is present in the electronic-manual browsing apparatus 10. However, the present invention is not limited to this. For example, in an electronic-manual browsing system in which the electronic-manual-data storing section 13 is disposed on an electronic-manual storage server, the electronic-manual browsing apparatus 10 can access the electronic-manual storage server and display the electronic manual. FIG. 17 is a block diagram schematically showing an example of the configuration of the electronic-manual browsing system. In the figure, the electronic-manual browsing apparatus 10 and an electronic-manual storage server 30 including an electronic-manual-data storing section 31 are connected via a network 40. The electronic-manual-display processing section of the electronic-manual browsing apparatus 10 has a function of displaying electronic manual data in the electronic-manual storage server 30 just like a browser.

A method of copying a sample program in such a configuration is not limited either. For example, a button for instructing copying of the sample program and notifying the program-creation-screen-display processing section 17 of, for example, a position (URL: Uniform Resource Locator) on a network indicating a place of the sample program can be provided on an electronic manual (document data). In such an example, when the button is pressed, the electronic-manual-display processing section 14 passes the URL to the program-creation-screen-display processing section 17. The program copy section 15 copies program data present in the designated URL and pastes the program data on a program creation screen.

Besides, a button for instructing copying of the sample program and acquiring program data from the place of the sample program can be provided on the electronic manual (document data). In such an example, when the button is pressed, the electronic-manual-display processing section 14 accesses the electronic-manual storage server 30, acquires the sample program, and stores the program data received from the electronic-manual storage server 30 in the copy-program storing section 16. The program-creation-screen-display processing section 17 then pastes the program data on the program creation screen.

Examples of a method of pasting the program data stored in the copy-program storing section 16 on the program creation screen include, when an OS (Operating System) is configured by Windows (registered trademark) or the like, a method of pasting the program data using a clipboard provided by the OS and a method of pasting the program data using drag-and-drop.

Further, besides, when a copy button for the sample program is selected on the electronic-manual display screen displayed by the electronic-manual-display processing section 14, a program can be converted into a component and stored in a local memory (e.g., a part of the copy-program storing section 16) for the program-creation-screen-display processing section 17. When copying of the sample program is instructed on the electronic-manual display screen, it can be arranged such that the program-creation-screen-display processing section 17 requests the program data to the electronic-manual-display processing section 14, and that the content of the request is stored in the local memory for the program-creation-screen-display processing section 17.

Sixth Embodiment

In the embodiments explained above, the sample program included in the electronic manual is pasted in a form usable on the program creation screen. In a sixth embodiment, an electronic-manual browsing apparatus is explained that can display an electronic manual including a sample program adapted to the configuration of a control system built by a user and copy the sample program.

Figure 18:
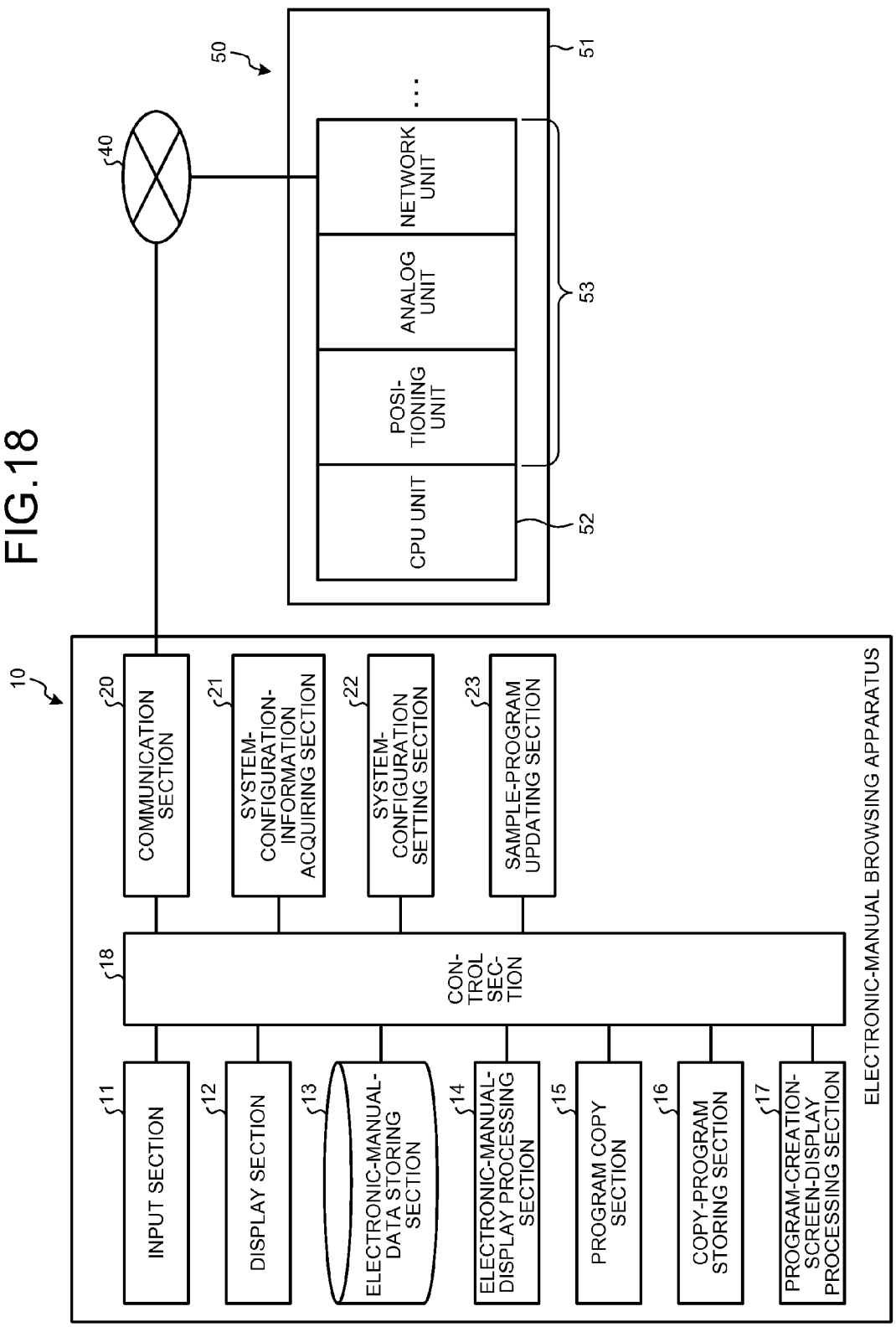
FIG. 18 is a block diagram schematically showing an example of the functional configuration of an electronic-manual browsing apparatus according to a sixth embodiment.

FIG. 18 is a block diagram schematically showing an example of the functional configuration of the electronic-manual browsing apparatus according to the sixth embodiment. The electronic-manual browsing apparatus 10 is connected to a control system 50, which is built by the user, via the network 40.

In the control system 50, a CPU unit 52 and other units 53 are connected on a base unit 51, in which the CPU unit 52 performs a predetermined operation on the basis of information concerning control from the other units 53 connected (attached) to the base unit 51 and transmits, for example, control information for controlling a target to be controlled to the other units 53. For the other units 53, for example, a positioning unit or an analog unit can be raised. The other units 53 are inserted into slots provided on the base unit 51. Note that, in general, slot numbers are allocated in order from a slot closest to the CPU unit 52 on the base unit 51.

The electronic-manual browsing apparatus 10 further includes, in the electronic-manual browsing apparatus 10 in the first embodiment, a communication section 20, a system-configuration-information acquiring section 21, a system-configuration setting section 22, and a sample-program updating section 23.

The communication section 20 performs communication with the control system 50 connected to the communication section 20 via the network 40. The system-configuration-information acquiring section 21 acquires, from the CPU unit 52 and each of the other units 53 (control apparatuses) configuring the control system 50, system configuration information including unit numbers indicating type names of the units and slot numbers, which are attaching positions on the base unit 51.

The system-configuration setting section 22 reads the acquired system configuration information, creates a system-configuration setting screen using the system configuration information and information acquired from the electronic manual stored in the electronic-manual-data storing section 13 on the basis of the system configuration information, and causes the display section 12 to display the system-configuration setting screen. The system-configuration setting section 22 generates sample program update information, which includes content set by the user via the input section 11, necessary for updating the sample program according to the system configuration information.

FIG. 19 is a diagram showing an example of the system-configuration setting screen. An example of a system-configuration setting screen 1900 for allocation of input and output addresses of the units is shown. The system-configuration setting screen 1900 includes sample program update information 1910. The sample program update information 1910 includes "slot" 1911 indicating a slot number attached to each of the slots of the base unit 51, "type" 1912 indicating a type of each of the units inserted into the respective slots, "type name" 1913 indicating a type name of each of the units inserted into the respective slots, "number of points" 1914 indicating the number of input and output addresses of each of the units, and "head XY" 1915 indicating a head input and output address allocated to each of the units. In the "slot" 1922 and the "type name" 1913, when the system configuration information is read, a slot number and a unit number of the system configuration information are automatically input by the system-configuration setting section 22 and displayed on the display section 12.

The system-configuration setting section 22 searches through an electronic manual corresponding to the unit number in the system configuration information, acquires the number of input and output addresses from the electronic manual, and inputs the number to the "number of points" 1914 of the system-configuration setting screen 1900. It is assumed that the electronic-manual-data storing section 13 has a data structure for enabling retrieval of electronic manual data from the "type name" and the electronic manual data has a data structure for enabling retrieval of the number of input and output addresses of a unit corresponding to the "type name".

Further, the system-configuration setting section 22 automatically inputs, on the basis of the input "number of points" 1914, a head input and output address of the other unit 53 inserted into the slot on the closer side to the CPU unit 52. For example, when the number of input and output addresses (the number of points) is 16 (decimal notation) points and a head address (a head XY) is set to "0020 (hexadecimal notation)", a head address (a head XY) of a unit having a type name "L60AD4" inserted into a slot 0 is "0030" obtained by adding the number of input and output addresses (the number of points) "16 (decimal notation)" of the immediately preceding slot to a head address (a head XY) "0020 (hexadecimal notation)" of the immediately preceding slot. A head address (a head XY) of a unit having a type name "LX10" inserted into a slot 1 is "0040" obtained by adding the number of input and output addresses (the number of points) "16 (decimal notation)" of the immediately preceding slot to the head address (the head XY)" "0030 (hexadecimal notation)" of the immediately preceding slot. Subsequently, head addresses (head XYs) of the system-configuration setting screen 1900 are set in the same manner.

Note that the system-configuration setting screen 1900 can be edited by the user. The head addresses can be optionally changed. When a "setting end" button 1920 is selected by the user, content of the sample program update information 1910 at that point is stored.

When acquiring the sample program update information 1910 from the system-configuration setting section 22, the sample-program updating section 23 changes the sample program included in the electronic manual according to the sample program update information 1910 and generates an updated sample program. Note that, the sixth embodiment is based on the premise that the sample program is a file described in the XML format. Therefore, it is possible to obtain the updated sample program by substituting content of the sample program update information, specifically, the input and output address represented by the head XY in a sample program set in advance.

The electronic-manual-display processing section 14 displays the electronic manual on the display section 12. However, the electronic-manual-display processing section 14 has a function of displaying, when display of the sample program in the electronic manual is instructed, the updated sample program updated by the sample-program updating section 23. Note that components same as the components in the first embodiment are denoted by the same reference numerals and signs and explanation of the components is omitted.

Update processing of a sample program based on system configuration information according to the sixth embodiment is explained. FIG. 20 is a flowchart for explaining an example of a procedure of the update processing of the sample program according to the sixth embodiment.

First, the user connects the control system 50 built by combining the units (the control apparatuses) to the electronic-manual browsing apparatus 10 via the network 40 (step S111). Subsequently, the system-configuration-information acquiring section 21 of the electronic-manual browsing apparatus 10 acquires system configuration information from the connected control system 50 (step S112).

Thereafter, the system-configuration setting section 22 displays the system-configuration setting screen 1900 on the display section 12 using the acquired system configuration information (step S113). At this stage, only "type name" corresponding to each of the unit numbers are input to the position of the slot numbers in the sample program update information 1910 of the system-configuration setting screen 1900.

Subsequently, the system-configuration setting section 22 acquires, from the electronic-manual-data storing section 13, electronic manual data corresponding to the unit number of the acquired system configuration information (step S114). The electronic-manual-display processing section 14 displays the acquired electronic manual data on the display section 12 (step S115). The system-configuration setting section 22 acquires the number of input and output addresses from the acquired electronic manual (step S116) and inputs the value of the number to the "number of points" 1914 of the sample program update information 1910 of the system setting screen 1900 (step S117).

Thereafter, the system-configuration setting section 22 calculates head input and output address of each of the units inserted into the respective slots using the "number of points" 1914 and the "head XY" 1915 of the immediately preceding slot of the sample program update information 1910 (step S118) and inputs value of the head input and output address to the "head XY" 1915 of the sample program update information 1910 of the system setting screen 1900 (step S119).

Subsequently, when setting storage is instructed by the user (step S120), the system-configuration setting section 22 stores, as sample program update information, content of the system-configuration setting screen 1900 displayed on the display section 12 (step S121).

Thereafter, the sample-program updating section 23 updates, according to the sample program update information, the sample program included in the electronic manual displayed on the display section 12 (step S122).

When the user instructs display processing of the sample program in the electronic manual via the input section 11 (step S123), the electronic-manual-display processing section 14 displays the updated sample program on the display section 12 (step S124). Consequently, the display processing of the updated sample program ends.

Note that the sample program changed according to the system configuration of the control system 50 can be copied and pasted to a program creation screen as described in the first embodiment. However, because the pasting processing is explained in the first embodiment, explanation of the pasting processing is omitted.

In the sixth embodiment, the system configuration information of the control system built by the user is acquired, the electronic manual of the control apparatus configuring the system is acquired on the basis of the system configuration information, the sample program update information is generated, and the sample program in the electronic manual is updated on the basis of the sample program update information. Consequently, the sample program is based on the control system built by the user. There is an effect that it is easy to understand, for example, creation of a program by the user.

By combining the sixth embodiment with the first embodiment, the user copies the update program updated on the basis of the control system and performs programming using the update program. Therefore, complicated processing for performing setting of parameters such as input and output addresses is not performed, and thus there is an effect that the programming is made easier for the user.

INDUSTRIAL APPLICABILITY

As explained above, the electronic-manual browsing apparatus according to the present invention is useful for browsing of a manual of a control apparatus that includes a ladder program in an electronic manual.

REFERENCE SIGNS LIST

10 Electronic-manual browsing apparatus
11 Input section
12 Display section
13 Electronic-manual-data storing section
14 Electronic-manual-display processing section
15 Program copy section
16 Copy-program storing section
17 Program-creation-screen-display processing section
18 Control section
19 Program-data converting section
20 Communication section
21 System-configuration-information acquiring section
22 System-configuration setting section
23 Sample-program updating section
30 Electronic-manual storage server
40 Network
50 Control system
51 Base unit
52 CPU unit
53 Other units

The invention claimed is:

1. An electronic-manual browsing apparatus comprising:
a hardware processor;
an electronic-manual-display processing section configured to control a display to display an electronic-manual display screen having an electronic manual including a sample program concerning a control apparatus, wherein the sample program cannot be described in a form of a simple text;
a program-creation-screen-display processing section configured to control the display to display a program creation screen for creating a program used in the control apparatus; and
a program copy section that copies the sample program in the electronic manual selected according to an instruction from a user and temporarily stores the sample program, wherein:
the electronic manual includes data for program display, which is image data of the sample program of a graphic form, and program data, which is content of the sample program and associated with the data for program display,
the electronic-manual-display processing section displays the data for program display as the sample program in the electronic-manual display screen,
when copying is instructed for the data for program display, which is image data of the sample program in the electronic-manual display screen, the program copy section stores the program data associated with the data for program display,
the program-creation-screen-display processing section pastes the stored program data in the program creation screen and converts the program data of graphic form into editable program data of the graphic form and displays the editable program data on the display, and at least one of the electronic-manual-display processing section, the program-creation-screen-display processing section, the program copy section implemented in the hardware processor, wherein the program-creation-screen-display processing section converts data of the sample program by sequentially discriminating relating to an input side and an output side.

2. The electronic-manual browsing apparatus according to claim 1, wherein the program data is binary data or text data.

3. The electronic-manual browsing apparatus according to claim 1, wherein the data for program display and the program data are configured by separate files.

4. The electronic-manual browsing apparatus according to claim 1, further comprising an electronic-manual-data storing section that stores the electronic manual.

5. The electronic-manual browsing apparatus according to claim 1, wherein the sample program is a ladder program.

6. The electronic-manual browsing apparatus according to claim 5, wherein the program-creation-screen-display processing section pastes, according to selection by the user, the sample program in the program creation screen in a ladder graphic form or a function block graphic form obtained by visually simplifying a part of the ladder program.

7. The electronic-manual browsing apparatus according to claim 1, wherein data for program display and program data are integrated as one file.

8. The electronic-manual browsing apparatus according to claim 1, wherein the electronic manual comprises is an operation manual which links a computer operation manual with at least one electronic apparatus operation manual, and the at least one application software operation manual.

9. The electronic-manual browsing apparatus according to claim 1, wherein the electronic manual comprises an operation manual of a programmable controller which configures a factory automation system, and the sample program in graphic form and wherein, in response to receiving a user selection of the sample program, converting image data of the sample program into program data in the editable form and providing the sample program in editable form to engineering software such that the sample program is part of a program concerning the programmable controller, which controls the factory automation system.

10. The electronic-manual browsing apparatus according to claim 1, wherein the program-creation-screen-display processing section converts the image data of the sample program by sequentially discriminating, from an input side to an output side of a ladder program, horizontal connection lines and components in the image data.

11. The electronic-manual browsing apparatus according to claim 10, wherein the components comprise at least two of an input side bus, an output side bus, a horizontal connection line connecting at least two of the components, a sign of a respective one of the components, and a character described on the sign.

12. An electronic-manual browsing apparatus comprising:
a hardware processor;
an electronic-manual-display processing section configured to control a display to display an electronic-manual display screen having an electronic manual for a control apparatus including a sample program concerning the control apparatus, the sample program retaining content of the sample program and information for displaying the sample program in a graphic form on the display, wherein the sample program cannot be described in a form of a simple text;
a program-creation-screen-display processing section configured to control the display to display a program creation screen for creating a program used in the control apparatus;
a program copy section that copies the sample program in the electronic manual selected according to an instruction from a user and temporarily stores the sample program; and
a program-data converting section that reads, in order that components appear in the sample program, images of the components configuring the sample program in the image data and converts, using the components corresponding to the read images of the components, data for program display, which is the image data in the graphic form, into editable program data indicating content of the sample program, wherein:
the electronic-manual-display processing section is further configured to control the display to display the data for program display as the sample program in the electronic-manual display screen,
the program-creation-screen-display processing section converts the program data, which is converted by the program-data converting section, into editable program data of the graphic form and displays the editable program data on the display,
at least one of the electronic-manual display processing section, the program creation-screen-display section, the program copy section is implemented in the hardware processor, and
wherein the program-creation-screen-display processing section converts data of the sample program by sequentially discriminating relating to an input side and an output side.

13. The electronic-manual browsing apparatus according to claim 12, further comprising an electronic-manual-data storing section that stores the electronic manual.

14. The electronic-manual browsing apparatus according to claim 12, wherein the sample program is a ladder program.

15. The electronic-manual browsing apparatus according to claim 14, wherein the program-creation-screen-display processing section pastes, according to selection by the user, the sample program in the program creation screen in a ladder graphic form or a function block graphic form obtained by visually simplifying a part of the ladder program.

16. An electronic-manual browsing system comprising:
an electronic-manual browsing apparatus comprising:
a hardware processor;
an electronic-manual-display processing section configured to control a display to display an electronic-manual display screen having an electronic manual including a sample program concerning a control apparatus, wherein the sample program cannot be described in a form of a simple text;
a program-creation-screen-display processing section configured to control the display to display a program creation screen for creating a program used in the control apparatus; and
a program copy section that copies the sample program in the electronic manual selected according to an instruction from a user and temporarily stores the sample program, wherein:
the electronic manual includes data for program display, which is image data of the sample program of a graphic form, and program data, which is content of the sample program and associated with the data for program display, the electronic-manual-display processing section displays the data for program display as the sample program in the electronic-manual display screen, when copying is instructed for the data for program display, which is image data of the sample program in the electronic-manual display screen, the program copy section stores the program data associated with the data for program display, and the program-creation-screen-display processing section pastes the stored program data in the program creation screen and converts the program data into program data of a graphic form and displays the program data on the display, at least one of the electronic-manual-display processing section, the program-creation-screen-display processing section, the program copy section implemented in the hardware processor; and an electronic manual storing apparatus comprising a memory that stores the electronic manual and which is connected to the electronic-manual browsing apparatus via a network, and wherein the electronic-manual-display processing section is configured to control the display to display on the display section, the electronic manual read from the electronic-manual storing apparatus via the network, and wherein the program-creation-screen-display processing section converts data of the sample program by sequentially discriminating relating to an input side and an output side.

17. An electronic-manual browsing system comprising:
an electronic-manual browsing apparatus comprising
a hardware processor;
an electronic-manual-display processing section configured to control a display to display an electronic-manual display screen having an electronic manual for a control apparatus including a sample program concerning the control apparatus, the sample program retaining content of the sample program and information for displaying the sample program in a graphic form on the display, wherein the sample program cannot be described in a form of a simple text;
a program-creation-screen-display processing section configured to control the display to display a program creation screen for creating a program used in the control apparatus;
a program copy section that copies the sample program in the electronic manual selected according to an instruction from a user and temporarily stores the sample program; and
a program-data converting section that reads, in order that components appear in the sample program, images of the components configuring the sample program in the image data and converts, using the components corresponding to the read images of the components, data for program display, which is the image data in a graphic form, into program data indicating content of the sample program, wherein:

the electronic-manual-display processing section is further configured to control the display to display the data for program display as the sample program in the electronic-manual display screen, the program-creation-screen-display processing section converts the program data, which is converted by the program-data converting section, into program data of a graphic form and displays the program data on the display, at least one of the electronic-manual display processing section, the program creation-screen-display section, the program copy section is implemented in the hardware processor; and an electronic manual storing apparatus comprising a memory which stores the electronic manual and which is connected to the electronic-manual browsing apparatus via a network, wherein the electronic-manual-display processing section is further configured to control the display to display the electronic manual read from the electronic-manual storing apparatus via the network, and wherein the program-creation-screen-display processing section converts data of the sample program by sequentially discriminating relating to an input side and an output side.

* * * * *